United States Patent
Ling et al.

(10) Patent No.: US 10,953,711 B2
(45) Date of Patent: Mar. 23, 2021

(54) HITCH ASSIST SYSTEM

(71) Applicant: Ford Global Technologies, LLC, Dearborn, MI (US)

(72) Inventors: Yu Ling, Canton, MI (US); Chen Zhang, San Jose, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 233 days.

(21) Appl. No.: 16/038,475

(22) Filed: Jul. 18, 2018

(65) Prior Publication Data

US 2020/0023696 A1    Jan. 23, 2020

(51) Int. Cl.
| | | |
|---|---|---|
| *B60D 1/36* | (2006.01) | |
| *B60R 1/00* | (2006.01) | |
| *B62D 15/02* | (2006.01) | |
| *G06F 3/048* | (2013.01) | |
| *B60D 1/62* | (2006.01) | |

(52) U.S. Cl.
CPC .............. *B60D 1/36* (2013.01); *B60R 1/003* (2013.01); *B62D 15/025* (2013.01); *B60D 1/62* (2013.01); *B60R 2300/305* (2013.01); *B60R 2300/607* (2013.01); *B60R 2300/808* (2013.01); *B62D 15/0285* (2013.01); *G06F 3/048* (2013.01)

(58) Field of Classification Search
CPC .... B60D 1/36; B60D 1/62; B60R 1/00; B60R 1/003; B60R 2300/305; B60R 2300/607; B60R 2300/808; B62D 15/025; B62D 15/0285; G06F 3/048
USPC ........................................................ 280/477
See application file for complete search history.

(56) References Cited

U.S. PATENT DOCUMENTS

| | | | |
|---|---|---|---|
| 6,480,104 B1 | 11/2002 | Wall et al. | |
| 6,970,184 B2 | 11/2005 | Hirama et al. | |
| 7,429,051 B2* | 9/2008 | Bauer | B60D 1/36 280/6.15 |
| 9,102,271 B2 | 8/2015 | Trombley et al. | |
| 9,296,422 B2 | 3/2016 | Lavoie | |
| 9,434,381 B2* | 9/2016 | Windeler | G06K 9/00791 |
| 9,499,018 B2* | 11/2016 | Gehrke | B60D 1/36 |
| 9,834,049 B2* | 12/2017 | Strand | B60D 1/246 |
| 2013/0226390 A1* | 8/2013 | Luo | B60D 1/36 701/25 |
| 2015/0115571 A1* | 4/2015 | Zhang | H04N 7/183 280/477 |
| 2016/0052548 A1* | 2/2016 | Singh | B60D 1/36 701/37 |
| 2016/0375831 A1* | 12/2016 | Wang | B62D 15/0295 348/148 |
| 2018/0029429 A1* | 2/2018 | Janardhana | B62D 15/025 |

FOREIGN PATENT DOCUMENTS

JP        2016144017 A      8/2016

\* cited by examiner

*Primary Examiner* — Minnah L Seoh
*Assistant Examiner* — Felicia L. Brittman
(74) *Attorney, Agent, or Firm* — Raymond Copiellie; Price Heneveld LLP

(57) ABSTRACT

A hitch assist system is provided herein that includes an imager for capturing one or more images of a trailer having a coupler. The hitch assist system may also include a user-input device for inputting specifications of a hitch ball. A controller within the hitch assist system may be used for estimating a hitch ball height based on the inputted specifications and estimating a trailer height based on a height and projective geometry of the imager.

20 Claims, 14 Drawing Sheets

US 10,953,711 B2

HITCH ASSIST SYSTEM

FIELD OF THE INVENTION

The present disclosure generally relates to autonomous and semi-autonomous vehicle systems, and more particularly, to hitch assist systems that facilitate the hitching of a vehicle to a trailer.

BACKGROUND OF THE INVENTION

The process of hitching a vehicle to a trailer can be difficult, especially to those lacking experience. Accordingly, there is a need for a system that simplifies the process by assisting a user in a simple yet intuitive manner.

SUMMARY OF THE INVENTION

According to some aspects of the present disclosure, a hitch assist system is provided herein. The hitch assist system includes an imager for capturing one or more images of a trailer having a coupler. The hitch assist system also includes a user-input device for inputting specifications of a hitch ball. The hitch assist system further includes a controller for estimating a hitch ball height based on inputted specifications; and estimating a trailer height based on a height and projective geometry of the imager.

According to some aspects of the present disclosure, a hitch assist method is provided herein. The method includes capturing one or more images of a trailer having a coupler through an imager. The method also includes estimating a coupler height based on a height and projective geometry of the imager. Lastly, the method includes illustrating an overlay on a display to assist in aligning a hitch ball under the coupler.

According to some aspects of the present disclosure, a hitch assist system is provided herein. The hitch assist system includes a sensing system configured to detect a trailer having a coupler. A user-input device is used for specifying a specification of a hitch ball or the coupler. The hitch assist system further includes a controller for estimating a height difference between the sensing system and the hitch coupler based on projective geometry of the sensing system and generating a schematic image of the hitch ball or the coupler on a display.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
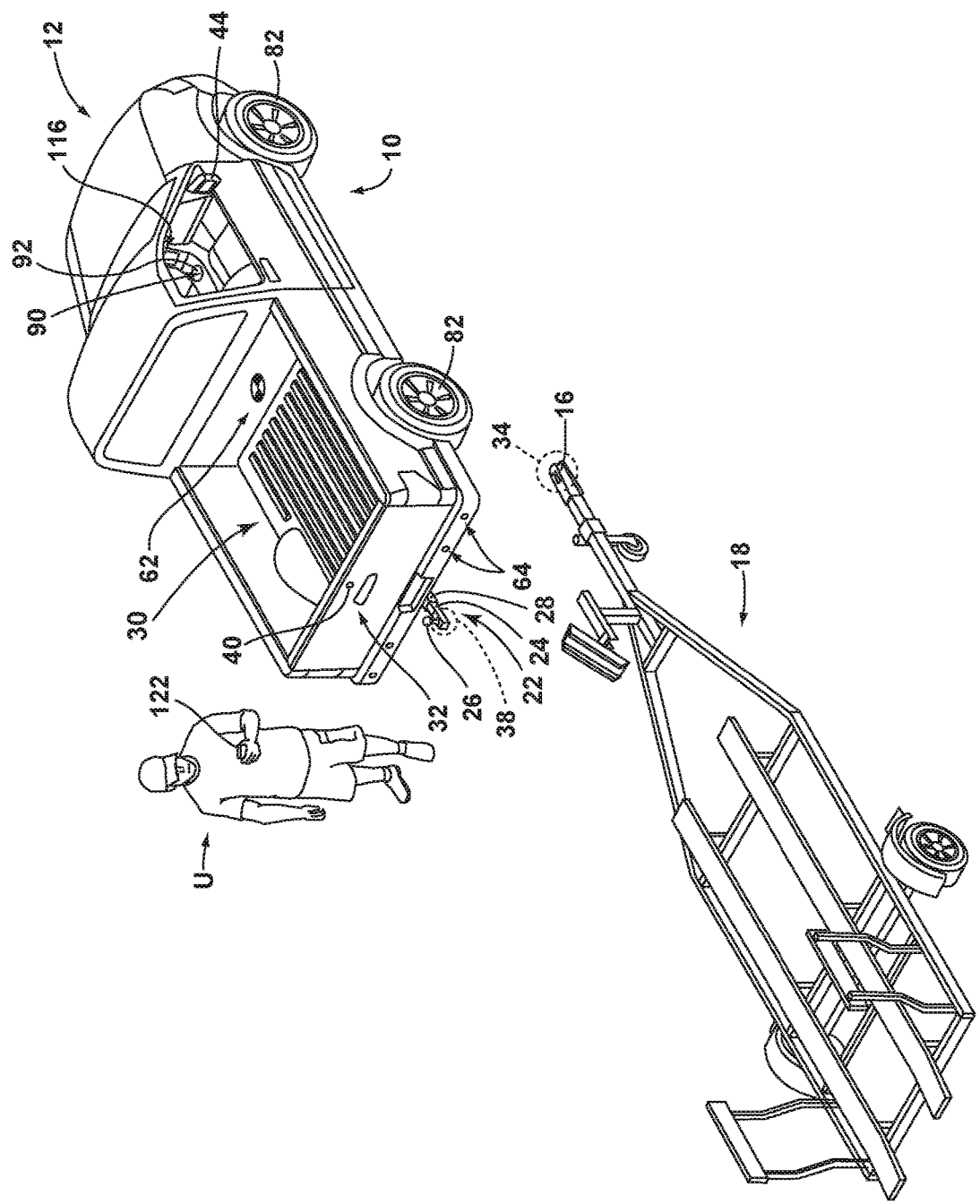
FIG. 1 is a top perspective view of a vehicle and a trailer, the vehicle being equipped with a hitch assistance system (also referred to as a "hitch assist" system), according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a hitch assist system for a vehicle. The hitch assist system may include an imager for capturing one or more images of a trailer having a coupler. The hitch assist system may also include a user-input device for inputting specifications of a hitch ball into the hitch assist system. The hitch assists system may further include a controller for estimating a hitch ball height based on the inputted specifications and estimating a trailer height based on a height and projective geometry of the imager. In some instances, a display may illustrate a scene rearwardly of the vehicle that is generated by an image patch. An overlay and/or a generated side image may be produced on the illustrated screen.

Figure 2:
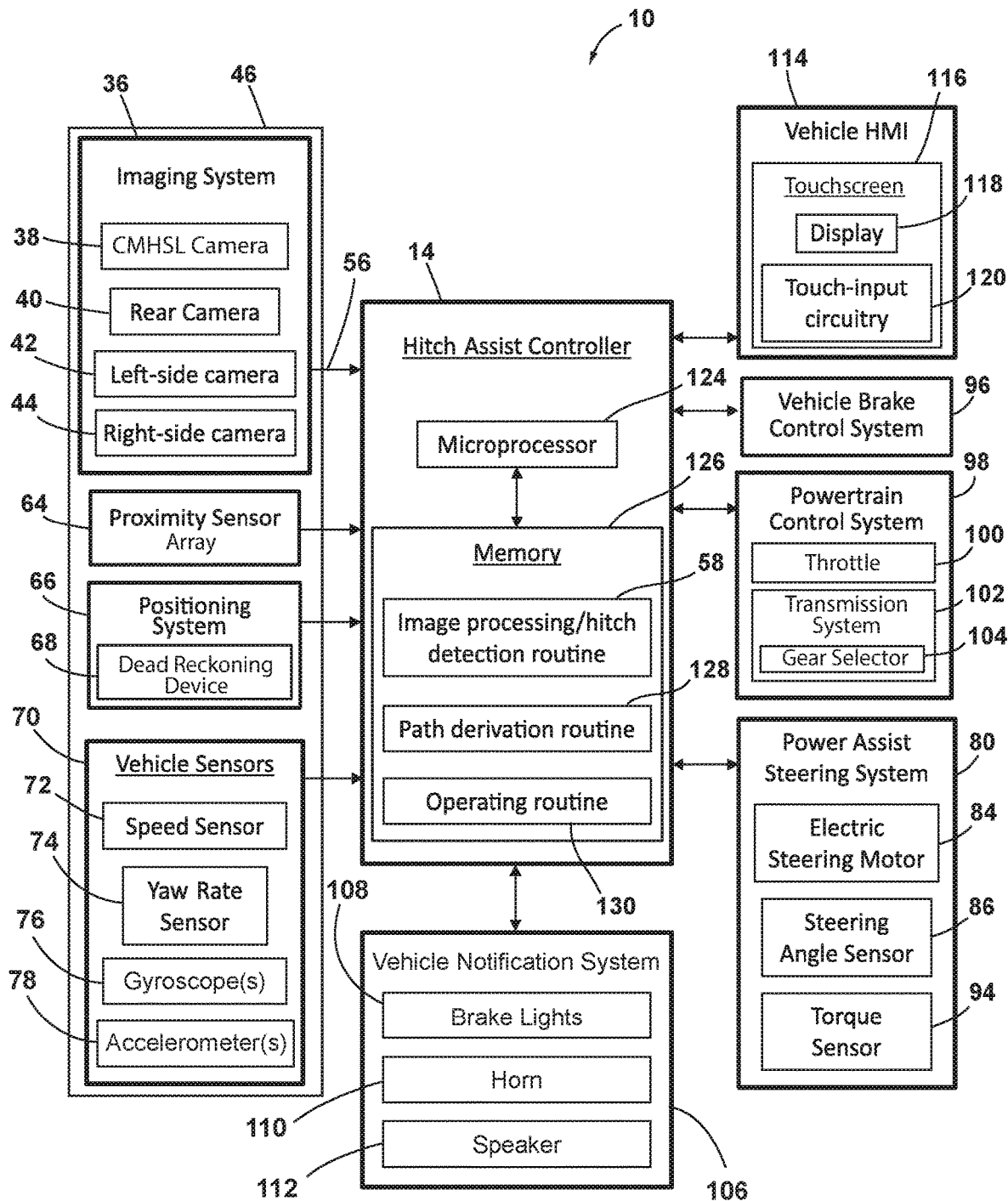
FIG. 2 is a block diagram illustrating various components of the hitch assist system, according to some examples.

Referring to FIGS. 1 and 2, reference numeral 10 designates a hitch assist system (also referred to as a "hitch assist" system) for a vehicle 12. In particular, the hitch assist system 10 includes a controller 14 acquiring position data of a coupler 16 of a trailer 18 and deriving a vehicle path 20 (FIG. 3) to align a hitch assembly 22 of the vehicle 12 with the coupler 16. In some examples, the hitch assembly 22 may include a ball mount 24 supporting a hitch ball 26. The hitch ball 26 may be fixed on the ball mount 24 that extends from the vehicle 12 and/or the hitch ball 26 may be fixed to a portion of the vehicle 12, such as a bumper of the vehicle 12. In some examples, the ball mount 24 may couple with a receiver 28 that is fixed to the vehicle 12.

As shown in FIG. 1, the vehicle 12 is exemplarily embodied as a pickup truck having a truck bed 30 that is accessible via a rotatable tailgate 32. The hitch ball 26 may be received by a hitch coupler 16 in the form of a coupler ball socket 34 that is provided at a terminal end portion of the trailer coupler 16. The trailer 18 is exemplarily embodied as a single axle trailer from which the coupler 16 extends longitudinally. It will be appreciated that additional examples of the trailer 18 may alternatively couple with the vehicle 12 to provide a pivoting connection, such as by connecting with a fifth wheel connector. It is also contemplated that additional examples of the trailer 18 may include more than one axle and may have various shapes and sizes configured for different loads and items, such as a box trailer or a flatbed trailer without departing from the teachings provided herein.

With respect to the general operation of the hitch assist system 10, as illustrated in FIG. 2, the hitch assist system 10 includes a sensing system 46 that includes various sensors and devices that obtain or otherwise provide vehicle status-related information. For example, in some instances, the sensing system 46 incorporates an imaging system 36 that includes one or more exterior imagers 38, 40, 42, 44, or any other vision-based device. The one or more imagers 38, 40, 42, 44 each include an area-type image sensor, such as a CCD or a CMOS image sensor, and image-capturing optics that capture an image of an imaging field of view (e.g., fields of view 48, 50, 52a, 52b, FIG. 5) defined by the image-capturing optics. In some instances, the one or more imagers 38, 40, 42, 44 may derive an image patch 54 (FIG. 12) from multiple image frames that may be shown on a display 118. In various examples, the hitch assist system 10 may include any one or more of a center high-mount stop light (CHMSL) imager 38, a rear imager 40, a left-side side-view imager 42, and/or a right-side side-view imager 44, although other arrangements including additional or alternative imagers are possible without departing from the scope of the present disclosure.

Figure 12:
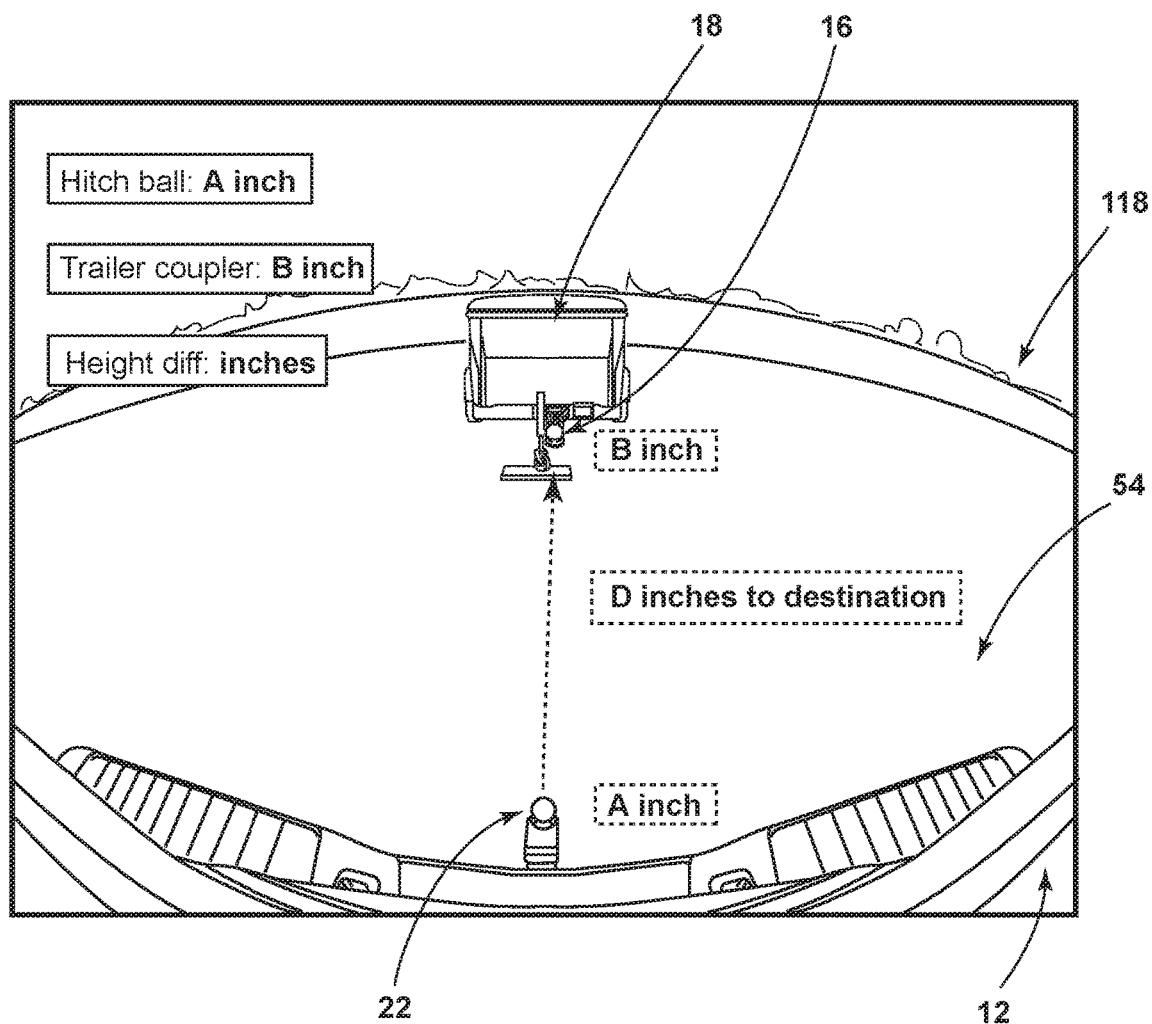
FIG. 12 represents an image captured and shown on the display of the vehicle and containing the coupler embodied as a coupler ball socket, according to various examples.

In some examples, the imaging system 36 can include the rear imager 40 alone or can be configured such that the hitch assist system 10 utilizes only the rear imager 40 in a vehicle 12 with the multiple exterior imagers 38, 40, 42, 44. In some instances, the various imagers 38, 40, 42, 44 included in the imaging system 36 can be positioned to generally overlap in their respective fields of view, which in the depicted arrangement of FIG. 5 includes fields of view 48, 50, 52a, 52b to correspond with the CHMSL imager 38, the rear imager 40, and the side-view imagers 42 and 44, respectively. In this manner, image data 56 from two or more of the imagers 38, 40, 42, 44 can be combined in an image processing routine 58, or in another dedicated image processor within the imaging system 36, into a single image or image patch 54 (FIG. 12). In an extension of such examples, the image data 56 can be used to derive stereoscopic image data 56 that can be used to reconstruct a three-dimensional scene of the area or areas within overlapped areas of the various fields of view 48, 50, 52a, 52b, including any objects (e.g., obstacles or the coupler 16) therein.

In some examples, the use of two images including the same object can be used to determine a location of the object relative to the two imagers 38, 40, 42, and/or 44, given a known spatial relationship between the imagers 38, 40, 42, 44 through projective geometry of the imagers 38, 40, 42, 44. In this respect, the image processing routine 58 can use known programming and/or functionality to identify an object within the image data 56 from the various imagers 38, 40, 42, 44 within the imaging system 36. The image processing routine 58 can include information related to the positioning of any of the imagers 38, 40, 42, 44 present on the vehicle 12 or utilized by the hitch assist system 10, including relative to a center 62 (FIG. 1) of the vehicle 12. For example, the positions of the imagers 38, 40, 42, 44 relative to the center 62 of the vehicle 12 and/or to each other can be used for object positioning calculations and to result in object position data relative to the center 62 of the vehicle 12, for example, or other features of the vehicle 12, such as the hitch ball 26 (FIG. 1), with known positions relative to the center 62 of the vehicle 12 in a manner similar to that, which is described in commonly assigned U.S. patent application Ser. No. 15/708,427, filed Sep. 19, 2017, now U.S.

Pat. No. 10,363,874, and entitled "HITCH ASSIST SYSTEM WITH HITCH COUPLER IDENTIFICATION FEATURE AND HITCH COUPLER HEIGHT ESTIMATION," the entire disclosure of which is incorporated by reference herein.

With further reference to FIGS. 1 and 2, a proximity sensor 64 or an array thereof, and/or other vehicle sensors 70, may provide sensor signals that the controller 14 of the hitch assist system 10 processes with various routines to determine various objects proximate the vehicle 12, the trailer 18, and/or the coupler 16 of the trailer 18. The proximity sensor 64 may also be utilized to determine a height and position of the coupler 16. The proximity sensor 64 may be configured as any type of sensor, such as an ultrasonic sensor, a radio detection and ranging (RADAR) sensor, a sound navigation and ranging (SONAR) sensor, a light detection and ranging (LIDAR) sensor, a vision-based sensor, and/or any other type of sensor known in the art.

Figure 3:
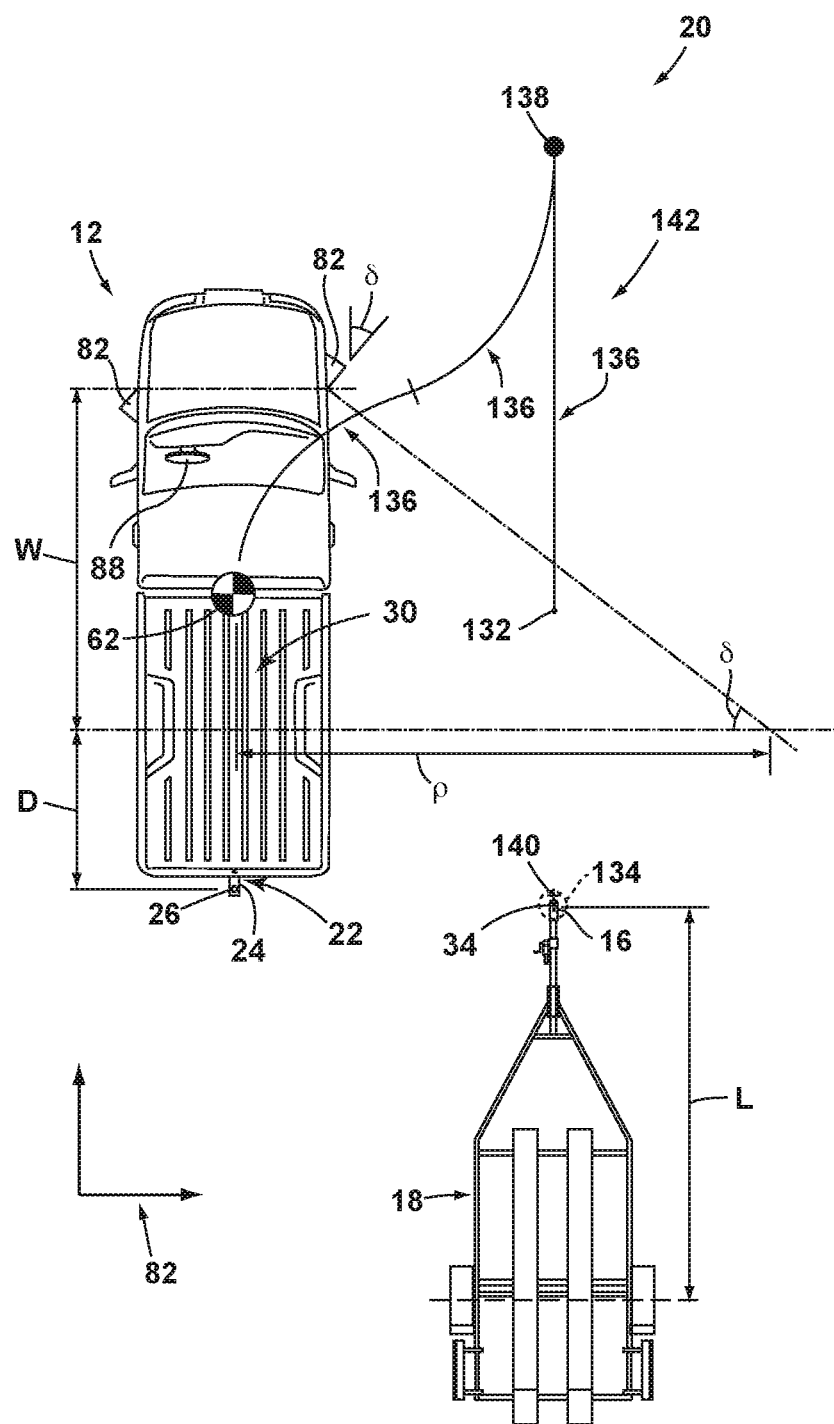
FIG. 3 is an overhead schematic view of the vehicle during a step of the alignment sequence with the trailer, according to some examples.
Figure 4:
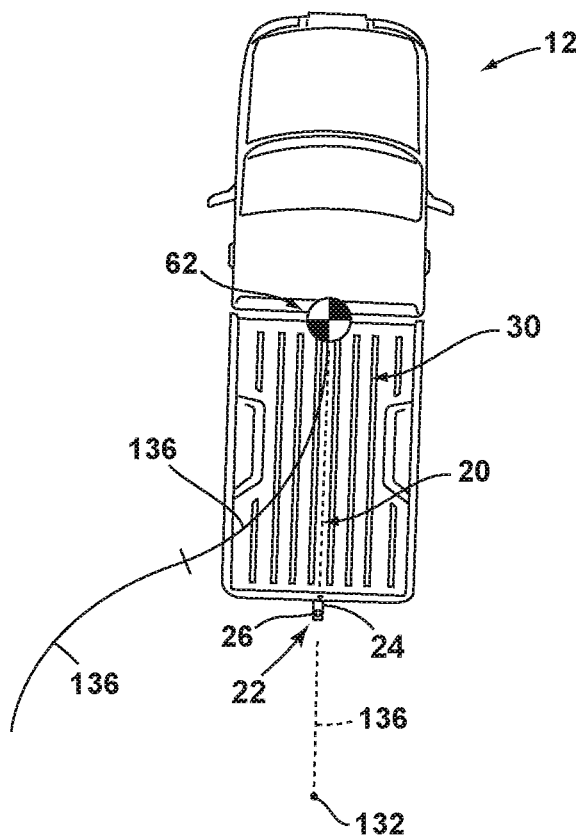
FIG. 4 is an overhead schematic view of the vehicle during a subsequent step of the alignment sequence with the trailer, according to some examples.
Figure 4:
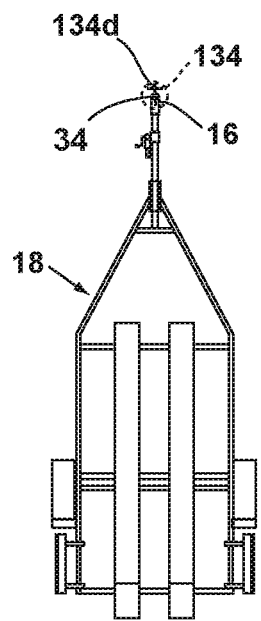

Referring still to FIGS. 1 and 2, a positioning system 66, which may include a dead reckoning device 68 or, in addition, or as an alternative, a global positioning system (GPS) that determines a coordinate location of the vehicle 12. For example, the dead reckoning device 68 can establish and track the coordinate location of the vehicle 12 within a localized coordinate system based at least on vehicle speed and/or steering angle $\delta$ (FIG. 3). The controller 14 may also be operably coupled with various vehicle sensors 70, such as a speed sensor 72 and a yaw rate sensor 74. Additionally, the controller 14 may communicate with one or more gyroscopes 76 and accelerometers 78 to measure the position, orientation, direction, and/or speed of the vehicle 12.

To enable autonomous or semi-autonomous control of the vehicle 12, the controller 14 of the hitch assist system 10 may be further configured to communicate with a variety of vehicle systems. According to some examples, the controller 14 of the hitch assist system 10 may control a power assist steering system 80 of the vehicle 12 to operate the steered road wheels 82 of the vehicle 12 while the vehicle 12 moves along a vehicle path 20. The power assist steering system 80 may be an electric power-assisted steering (EPAS) system that includes an electric steering motor 84 for turning the steered road wheels 82 to a steering angle $\delta$ based on a steering command generated by the controller 14, whereby the steering angle $\delta$ may be sensed by a steering angle sensor 86 of the power assist steering system 80 and provided to the controller 14. As described herein, the steering command may be provided for autonomously steering the vehicle 12 during a maneuver and may alternatively be provided manually via a rotational position (e.g., a steering wheel angle) of a steering wheel 88 (FIG. 3) or a steering input device 90, which may be provided to enable a driver to control or otherwise modify the desired curvature of the path 20 of vehicle 12. The steering input device 90 may be communicatively coupled to the controller 14 in a wired or wireless manner and provides the controller 14 with information defining the desired curvature of the path 20 of the vehicle 12. In response, the controller 14 processes the information and generates corresponding steering commands that are supplied to the power assist steering system 80 of the vehicle 12. In some examples, the steering input device 90 includes a rotatable knob 92 operable between a number of rotated positions that each provides an incremental change to the desired curvature of the path 20 of the vehicle 12.

In some examples, the steering wheel 88 of the vehicle 12 may be mechanically coupled with the steered road wheels 82 of the vehicle 12, such that the steering wheel 88 moves in concert with steered road wheels 82 via an internal torque, thereby preventing manual intervention with the steering wheel 88 during autonomous steering of the vehicle 12. In such instances, the power assist steering system 80 may include a torque sensor 94 that senses torque (e.g., gripping and/or turning) on the steering wheel 88 that is not expected from the autonomous control of the steering wheel 88 and therefore is indicative of manual intervention by the driver. In some examples, the external torque applied to the steering wheel 88 may serve as a signal to the controller 14 that the driver has taken manual control and for the hitch assist system 10 to discontinue autonomous steering functionality.

The controller 14 of the hitch assist system 10 may also communicate with a vehicle brake control system 96 of the vehicle 12 to receive vehicle speed information such as individual wheel speeds of the vehicle 12. Additionally or alternatively, vehicle speed information may be provided to the controller 14 by a powertrain control system 98 and/or the vehicle speed sensor 72, among other conceivable means. The powertrain control system 98 may include a throttle 100 and a transmission system 102. A gear selector 104 may be disposed within the transmission system 102 that controls the mode of operation of a vehicle transmission. In some examples, the controller 14 may provide braking commands to the vehicle brake control system 96, thereby allowing the hitch assist system 10 to regulate the speed of the vehicle 12 during a maneuver of the vehicle 12. It will be appreciated that the controller 14 may additionally or alternatively regulate the speed of the vehicle 12 via interaction with the powertrain control system 98.

Through interaction with the power assist steering system 80, the vehicle brake control system 96, and/or the powertrain control system 98 of the vehicle 12, the potential for unacceptable conditions can be reduced when the vehicle 12 is moving along the path 20. Examples of unacceptable conditions include, but are not limited to, a vehicle overspeed condition, sensor failure, and the like. In such circumstances, the driver may be unaware of the failure until the unacceptable backup condition is imminent or already happening. Therefore, it is disclosed herein that the controller 14 of the hitch assist system 10 can generate an alert signal corresponding to a notification of an actual, impending, and/or anticipated unacceptable backup condition, and prior to driver intervention, generate a countermeasure to prevent such an unacceptable backup condition.

According to some examples, the controller 14 may communicate with one or more devices, including a vehicle notification system 106, which may prompt visual, auditory, and tactile notifications and/or warnings. For instance, vehicle brake lights 108 and/or vehicle emergency flashers may provide a visual alert. A vehicle horn 110 and/or speaker 112 may provide an audible alert. Additionally, the controller 14 and/or vehicle notification system 106 may communicate with a user-input device, such as a human-machine interface (HMI) 114 of the vehicle 12. The HMI 114 may include a touchscreen 116, or other user-input device, such as a navigation and/or entertainment display 118 mounted within a cockpit module, an instrument cluster, and/or any other location within the vehicle 12, which may be capable of displaying images, indicating the alert.

In some instances, the HMI 114 further includes an input device, which can be implemented by configuring the display 118 as a portion of the touchscreen 116 with circuitry 120 to receive an input corresponding with a location over the display 118. Other forms of input, including one or more joysticks, digital input pads, or the like can be used in place or in addition to touchscreen 116.

Further, the hitch assist system 10 may communicate via wired and/or wireless communication with some instances of the HMI 114 and/or with one or more handheld or portable devices 122 (FIG. 1), which may additionally and/or alternatively be configured as the user-input device. The network may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The portable device 122 may also include the display 118 for displaying one or more images and other information to a user U. For instance, the portable device 122 may display one or more images of the trailer 18 on the display 118 and may be further able to receive remote user inputs via touchscreen circuitry 120. In addition, the portable device 122 may provide feedback information, such as visual, audible, and tactile alerts. It will be appreciated that the portable device 122 may be any one of a variety of computing devices and may include a processor and memory. For example, the portable device 122 may be a cell phone, mobile communication device, key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications and/or any wired communications protocols.

The controller 14 is configured with a microprocessor 124 and/or other analog and/or digital circuitry for processing one or more logic routines stored in a memory 126. The logic routines may include one or more routines including the image processing routine 58, a hitch detection routine, a path derivation routine 128, and an operating routine 130. Information from the imager 40 or other components of the sensing system 46 can be supplied to the controller 14 via a communication network of the vehicle 12, which can include a controller area network (CAN), a local interconnect network (LIN), or other protocols used in the automotive industry. It will be appreciated that the controller 14 may be a stand-alone dedicated controller or may be a shared controller integrated with the imager 40 or other component of the hitch assist system 10 in addition to any other conceivable onboard or off-board vehicle control systems.

The controller 14 may include any combination of software and/or processing circuitry suitable for controlling the various components of the hitch assist system 10 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. All such computing devices and environments are intended to fall within the meaning of the term "controller" or "processor" as used herein unless a different meaning is explicitly provided or otherwise clear from the context.

With further reference to FIGS. 2-6, the controller 14 may generate vehicle steering information and commands as a function of all or a portion of the information received. Thereafter, the vehicle steering information and commands may be provided to the power assist steering system 80 for effecting the steering of the vehicle 12 to achieve a commanded path 20 of travel for alignment with the coupler 16 of the trailer 18. It will further be appreciated that the image processing routine 58 may be carried out by a dedicated processor, for example, within a stand-alone imaging system 36 for the vehicle 12 that can output the results of its image processing to other components and systems of vehicle 12, including the microprocessor 124. Further, any system, computer, processor, or the like that completes image processing functionality, such as that described herein, may be referred to herein as an "image processor" regardless of other functionality it may also implement (including simultaneously with executing the image processing routine 58).

In some examples, the image processing routine 58 can be programmed or otherwise configured to locate the coupler 16 within the image data 56. In some instances, the image processing routine 58 can identify the coupler 16 within the image data 56 based on stored or otherwise known visual characteristics of the coupler 16 or hitches in general. In some instances, a marker in the form of a sticker or the like may be affixed with trailer 18 in a specified position relative to coupler 16 in a manner similar to that, which is described in commonly assigned U.S. Pat. No. 9,102,271, entitled "TRAILER MONITORING SYSTEM AND METHOD," the entire disclosure of which is incorporated by reference herein. In such examples, the image processing routine 58 may be programmed with identifying characteristics of the marker for location in the image data 56, as well as the positioning of the coupler 16 relative to such a marker so that the location 28 of the coupler 16 can be determined based on the marker location. Additionally or alternatively, the controller 14 may seek confirmation of the coupler 16, via a prompt on the touchscreen 116 and/or the portable device 122. If the coupler 16 determination is not confirmed, further image processing may be provided, or user-adjustment of the position 134 of the coupler 16 may be facilitated, either using the touchscreen 116 or another input to allow the user to move the depicted position 134 of the coupler 16 on the touchscreen 116, which the controller 14 uses to adjust the determination of the position 134 of the coupler 16 with respect to the vehicle 12 based on the above-described use of the image data 56. Alternatively, the user can visually determine the position 134 of the coupler 16 within an image presented on HMI 114 and can provide a touch input in a manner similar to that, which is described in co-pending, commonly-assigned U.S. patent application Ser. No. 15/583, 014, filed May 1, 2017, now U.S. Pat. No. 10,266,023, and entitled "SYSTEM TO AUTOMATE HITCHING A TRAILER," the entire disclosure of which is incorporated by reference herein. The image processing routine 58 can then correlate the location of the touch input with the coordinate system applied to the image patch.

As shown in FIGS. 3-6, in some exemplary instances of the hitch assist system 10, the image processing routine 58 and operating routine 130 may be used in conjunction with each other to determine the path 20 along which the hitch assist system 10 can guide the vehicle 12 to align the hitch ball 26 and the coupler 16 of the trailer 18. In the example shown, an initial position of the vehicle 12 relative to the trailer 18 may be such that the coupler 16 is in the field of view 52a of the side imager 42, with the vehicle 12 being positioned latitudinally from the trailer 18 but with the coupler 16 being almost longitudinally aligned with the hitch ball 26. In this manner, upon initiation of the hitch assist system 10, such as by user input on the touchscreen 116, for example, the image processing routine 58 can identify the coupler 16 within the image data 56 of the imager 42 and estimate the position 134 of the coupler 16 relative to the hitch ball 26 using the image data 56 in accordance with the examples discussed above or by other known means, including by receiving focal length information within image data 56 to determine a distance $D_c$ to the coupler 16 and an angle $\alpha_c$ of offset between the coupler 16 and the longitudinal axis of vehicle 12. Once the positioning $D_c$, $\alpha_c$ of the coupler 16 has been determined and, optionally, confirmed by the user, the controller 14 can take control of at least the vehicle steering system 80 to control the movement of the vehicle 12 along the desired path 20 to align the vehicle hitch ball 26 with the coupler 16.

Continuing with reference to FIG. 3, the controller 14 (FIG. 2), having estimated the positioning $D_c$, $\alpha_c$ of the coupler 16, as discussed above, can, in some examples, execute the path derivation routine 128 to determine the vehicle path 20 to align the vehicle hitch ball 26 with the coupler 16. The controller 14 can store various characteristics of vehicle 12, including a wheelbase W, a distance D from the rear axle to the hitch ball 26, which is referred to herein as the drawbar length, as well as a maximum angle to which the steered wheels 82 can be turned $\delta_{max}$. As shown, the wheelbase W and the current steering angle $\delta$ can be used to determine a corresponding turning radius p for the vehicle 12 according to the equation:

$$\rho = \frac{1}{W \tan \delta}, \quad (1)$$

in which the wheelbase W is fixed and the steering angle $\delta$ can be controlled by the controller 14 by communication with the steering system 80, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}. \quad (2)$$

The path derivation routine 128 can be programmed to derive the vehicle path 20 to align a known location of the vehicle hitch ball 26 with the estimated position 134 of the coupler 16 that takes into account the determined minimum turning radius $\rho_{min}$, which may allow the path 20 to use the minimum amount of space and maneuvers. In this manner, the path derivation routine 128 can use the position of the vehicle 12, which can be based on the center 62 of the vehicle 12, a location along the rear axle, the location of the dead reckoning device 68, or another known location on the coordinate system, to determine both a lateral distance to the coupler 16 and a forward or rearward distance to coupler 16 and derive the path 20 that achieves lateral and/or forward-backward movement of the vehicle 12 within the limitations of the steering system 80. The derivation of the path 20 further takes into account the positioning of the hitch ball 26 relative to the tracked location of vehicle 12 (which may correspond with the center 62 of mass of the vehicle 12, the location of a GPS receiver, or another specified, known area) to determine the needed positioning of the vehicle 12 to align the hitch ball 26 with the coupler 16.

Once the projected path 20, including the endpoint 132, has been determined, the controller 14 may at least control the steering system 80 of the vehicle 12 with the powertrain control system 98 and the brake control system 96 (whether controlled by the driver or by the controller 14) controlling the speed (forward or rearward) of the vehicle 12. In this manner, the controller 14 can receive data regarding the position of the vehicle 12 during movement thereof from the positioning system 66 while controlling the steering system 80 to maintain the vehicle 12 along the path 20. The path 20, having been determined based on the vehicle 12 and the geometry of steering system 80, can adjust the steering angle $\delta$, as dictated by the path 20, depending on the position of the vehicle 12 therealong.

As illustrated in FIG. 3, the initial positioning of the trailer 18 relative to the vehicle 12 may be such that forward movement of vehicle 12 is needed for the desired vehicle path 20, such as when the trailer 18 is latitudinally offset to the side of vehicle 12. In this manner, the path 20 may include various segments 136 of forward driving and/or rearward driving of the vehicle 12 separated by inflection points 138 at which the vehicle 12 transitions between forward and rearward movement. As used herein, "inflection points" are any point along the vehicle path in which a vehicle condition is changed. The vehicle conditions include, but are not limited to, a change in speed, a change in steering angle $\delta$, a change in vehicle direction, and/or any other possible vehicle condition that may be adjusted. For example, if a vehicle speed is altered, an inflection point 138 may be at the location where the speed was altered. In some examples, the path derivation routine 128 can be configured to include a straight backing segment 136 for a defined distance before reaching the point at which the hitch ball 26 is aligned with the position 134 of the coupler 16. The remaining segments 136 can be determined to achieve the lateral and forward/backward movement within the smallest area possible and/or with the lowest number of overall segments 136 or inflection points 138. In the illustrated example of FIG. 3, the path 20 can include two segments 136 that collectively traverse the lateral movement of the vehicle 12, while providing a segment 136 of straight rearward backing to bring the hitch ball 26 into an offset position 134 of the coupler 16, one of which includes forward driving with a maximum steering angle $\delta_{max}$ in the rightward-turning direction and the other including forward driving with a maximum steering angle $\delta_{max}$ in the leftward-turning direction. Subsequently, an inflection point 138 is included in which the vehicle 12 transitions from forward driving to rearward driving followed by the previously-mentioned straight rearward backing segment 136. It is noted that variations in the depicted path 20 may be used, including a variation with a single forward-driving segment 136 at a rightward steering angle $\delta$ less than the maximum steering angle $\delta_{max}$, followed by an inflection point 138 and a rearward driving segment 136 at a maximum leftward steering angle $\delta_{max}$ with a shorter straight backing segment 136, with still further paths 20 being possible.

In some instances, the hitch assist system 10 may be configured to operate with the vehicle 12 in reverse only, in which case, the hitch assist system 10 can prompt the driver to drive vehicle 12, as needed, to position the trailer 18 in a designated area relative to the vehicle 12, including to the rear thereof so that path derivation routine 128 can determine a vehicle path 20 that includes rearward driving. Such instructions can further prompt the driver to position the vehicle 12 relative to the trailer 18 to compensate for other limitations of the hitch assist system 10, including a particular distance for identification of the coupler 16, a minimum offset angle $\alpha_c$, or the like. It is further noted that the estimates for the positioning $D_c$, $α_c$ of the coupler 16 may become more accurate as the vehicle 12 traverses the path 20, including to position the vehicle 12 in front of the trailer 18 and as the vehicle 12 approaches the coupler 16. Accordingly, such estimates can be derived and used to update the path derivation routine 128, if desired, in the determination of the adjusted initial endpoint 132 for the path 20.

Figure 5:
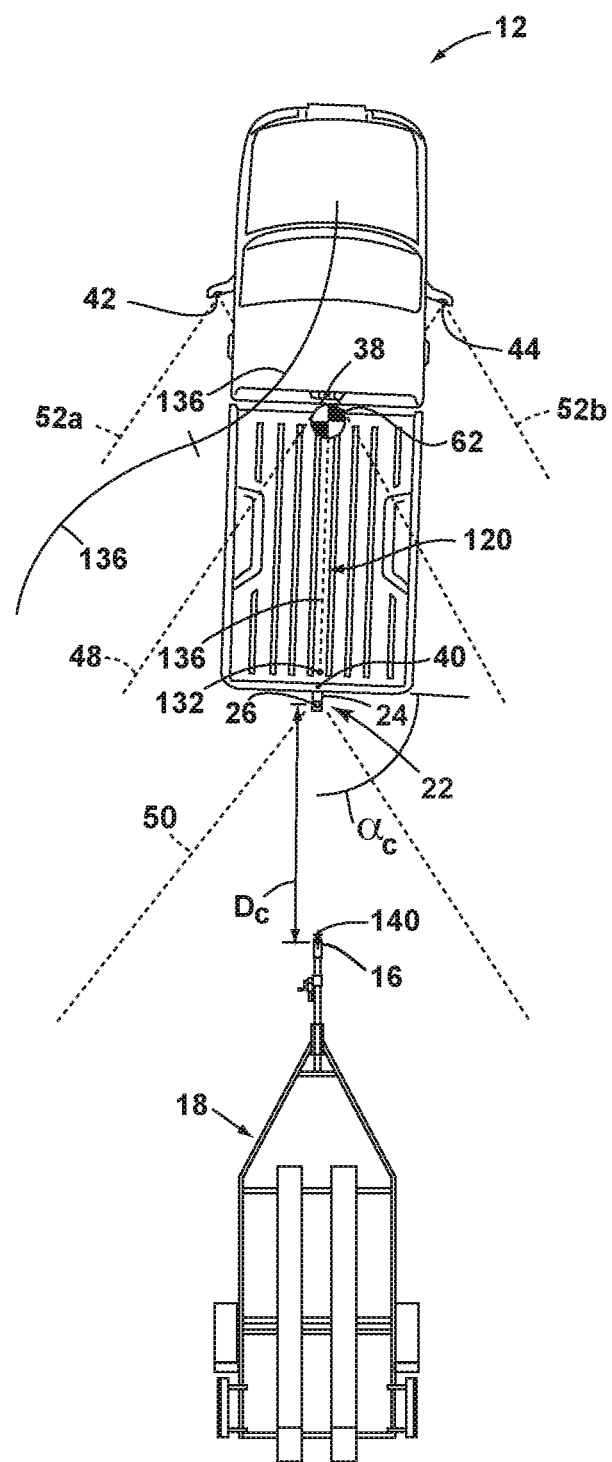
FIG. 5 is an overhead schematic view of the vehicle during a subsequent step of the alignment sequence with the trailer, according to some examples.
Figure 6:
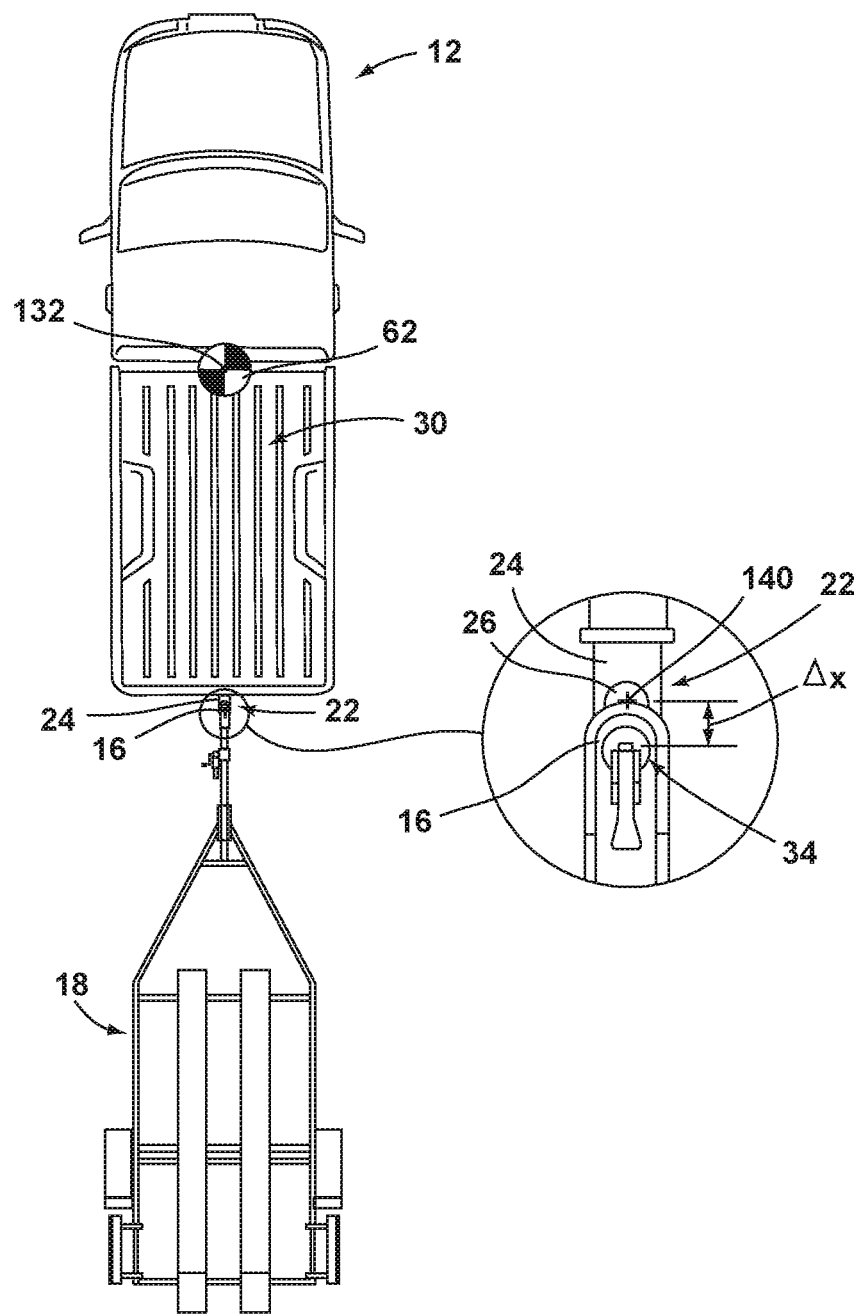
FIG. 6 is an overhead schematic view of the vehicle during a subsequent step of the alignment sequence with the trailer and showing the position of a hitch ball of the vehicle at an end of a derived alignment path, according to some examples.

Referring to FIGS. 5 and 6, a strategy for determining an initial endpoint 132 for the vehicle path 20 that places hitch ball 26 in a projected position for alignment with the coupler 16 involves calculating the actual or an approximate trajectory for movement of the coupler 16 while lowering the coupler 16 onto the hitch ball 26. The initial endpoint 132 is then derived, as discussed above or otherwise, to place hitch ball 26 at the desired location 140 on that trajectory. In effect, such a scheme is implemented by determining the difference between the height $H_c$ of the coupler 16 and the height $H_b$ of the hitch ball 26, which represents the vertical distance by which coupler 16 will be lowered to engage with hitch ball 26. The determined trajectory is then used to relate the vertical distance with a corresponding horizontal distance Δx of coupler 16 movement in the driving direction that results from the vertical distance. This horizontal distance Δx can be input into the path derivation routine 128 as the desired initial endpoint 132 thereof or can be applied as an offset to the initial endpoint 132 derived from the initially determined position 134 of the coupler 16 when the path 20 ends with the straight-backing segment 136, as illustrated in FIG. 3.

Referring again to FIGS. 5 and 6, the operating routine 130 may continue to guide the vehicle 12 until the hitch ball 26 is in the desired final endpoint 140 relative to the coupler 16 for the coupler 16 to engage with the hitch ball 26 when the coupler 16 is lowered into alignment and/or engagement therewith. In the examples discussed above, the image processing routine 58 monitors the positioning $D_c$, αc of the coupler 16 during execution of the operating routine 130, including as the coupler 16 comes into clearer view of the rear imager 40 with continued movement of the vehicle 12 along the path 20. As discussed above, the position of the vehicle 12 can also be monitored by the dead reckoning device 68 with the position 134 of the coupler 16 being updated and fed into the path derivation routine 128 in case the path 20 and or the initial endpoint 132 can be refined or should be updated (due to, for example, improved height $H_c$, distance $D_c$, or offset angle $α_c$ information due to closer resolution or additional image data 56), including as the vehicle 12 moves closer to the trailer 18. In some instances, the coupler 16 can be assumed static such that the position of the vehicle 12 can be tracked by continuing to track the coupler 16 to remove the need for use of the dead reckoning device 68. In a similar manner, a modified variation of the operating routine 130 can progress through a predetermined sequence of maneuvers involving steering of the vehicle 12 at or below a maximum steering angle $δ_{max}$, while tracking the position $D_c$, $α_c$ of the coupler 16 to converge the known relative position of the hitch ball 26 to the desired final endpoint 140 thereof relative to the tracked position 134 of the coupler 16.

Figure 7:
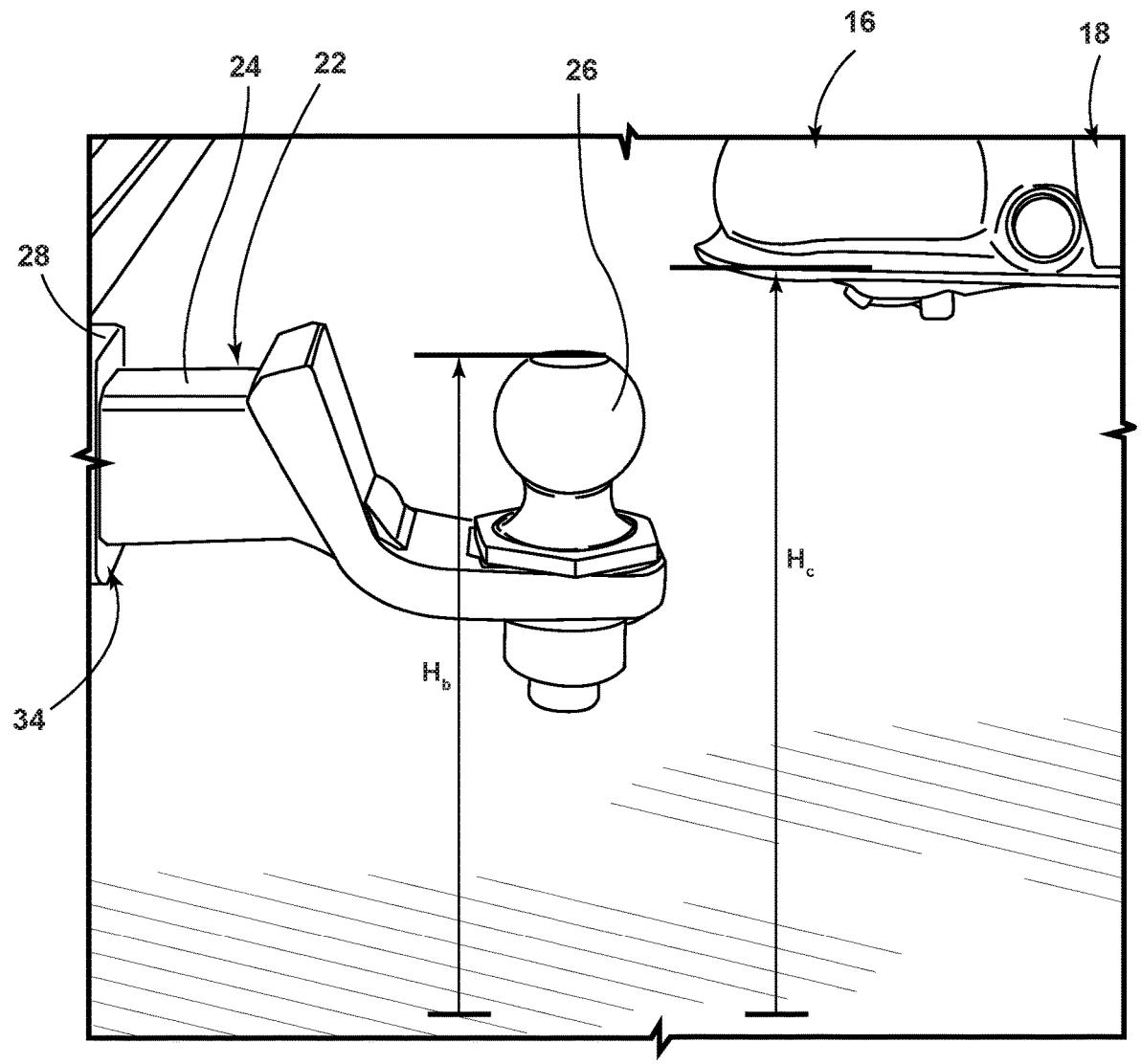
FIG. 7 is a perspective view of a hitch assembly coupled with the vehicle and disposed proximately to the coupler of the trailer.
Figure 8:
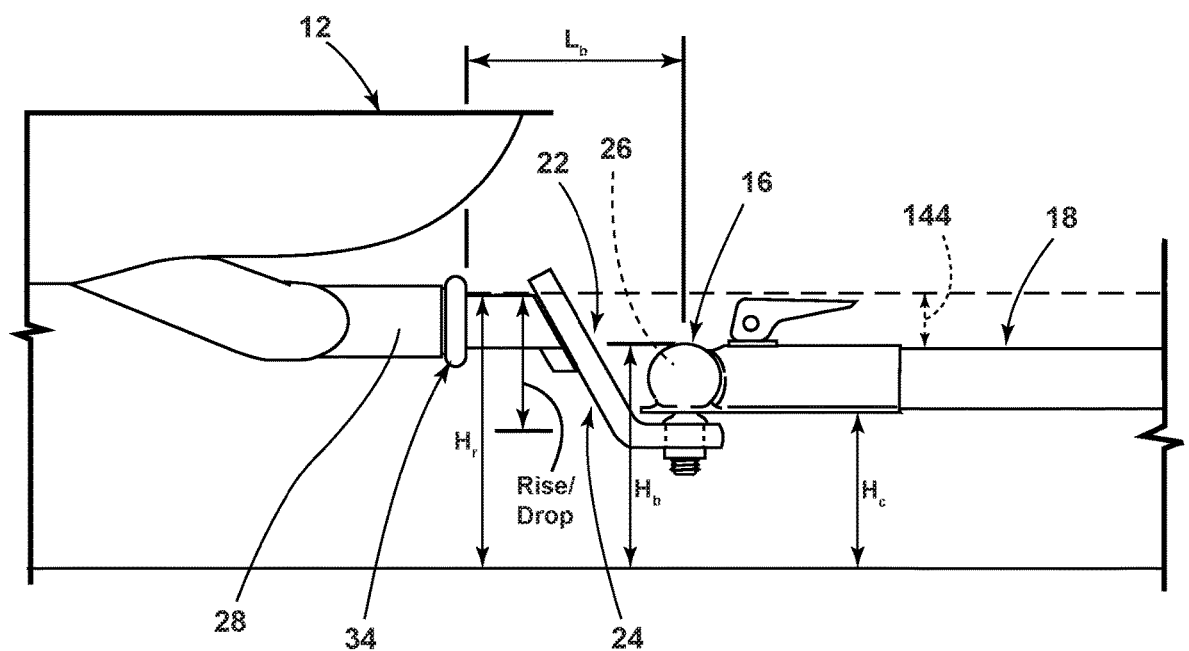
FIG. 8 is a side plan view of the hitch assembly and the coupler operably coupled with one another, according to some examples.
Figure 9:
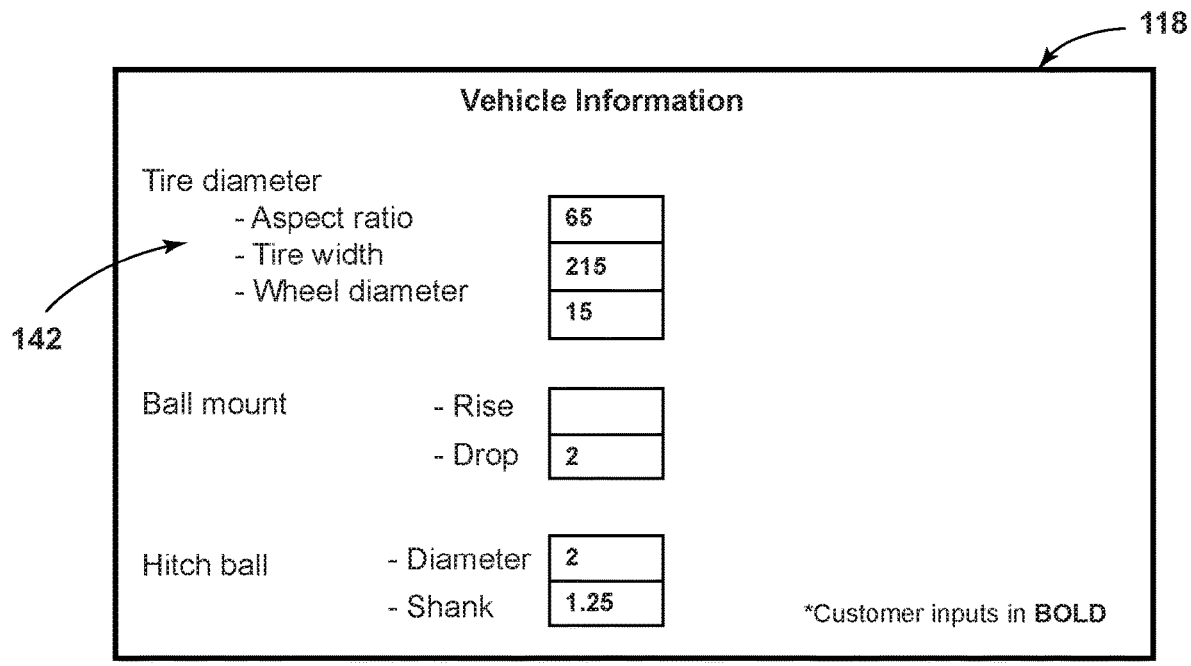
FIG. 9 is an exemplary image on a display wherein a user of the hitch assist system may enter various specifications of the vehicle and/or the hitch assembly, according to some examples.

Referring to FIGS. 7-9, in some examples, various vehicle specifications 142 may be automatically determined by the hitch assist system 10 and/or manually input by the user U (FIG. 1) into the hitch assist system 10. The specifications 142 may include a wide range of measurements that may affect the height $H_b$ of the hitch ball 26, such as road wheel information (e.g., aspect ratio, tire width, wheel diameter, etc.), ball mount length $L_{bm}$, ball mount rise/drop 144, hitch ball diameter, hitch ball shank, etc. The information may be stored within the memory 126 (FIG. 2) and utilized during any operating routine 58, 128, 130. For example, the vehicle specifications 142 may be used to determine a hitch ball height $H_b$ that may be compared to a coupler height $H_c$ to determine whether the coupler 16 may be disposed over the hitch ball 26 to mitigate some contact risks between the coupler 16 and the vehicle 12. Moreover, the vehicle notification system 106 and/or the display 118 may provide the user U with a notification if the hitch assist system 10 detects that the trailer 18 is in a non-level orientation when coupled to the hitch ball 26 and/or prior to coupling to the hitch ball 26 based on a projected height $H_c$, $H_b$ of the coupler 16 and hitch ball 26 once coupled to one another.

Referring to FIGS. 8-11, in some instances, the driver may enter various specifications 142 into the hitch assist system 10. In some instances, the display 118 may instruct the user U on conducting various measurements to calculate and/or obtain the specifications 142. For example, the display 118 may provide instruction on how to measure the length $L_{bm}$ of the ball mount 24, the receiver opening height, the hitch ball rise/drop 144, and/or the coupler height $H_c$. The specifications 142 may be inputted into the display 118, as exemplarily illustrated in FIG. 9. Once the specifications 142 are inputted into the hitch assist system 10, the specifications 142 may be stored for future uses of the hitch assist system 10. In some examples, the sensing system 46 may detect one or more features of the ball mount 24 and/or the hitch ball 26. The features may be used by the hitch assist system 10 in subsequent auto hitch operations to deem whether the same hitch assembly 22 and/or the hitch ball 26 is being used as previously stored within the memory 126. Additionally, and/or alternatively, the user U may confirm usage of a previously stored ball mount 24 and hitch ball 26 after initiation of the hitch assist system 10.

Figure 10:
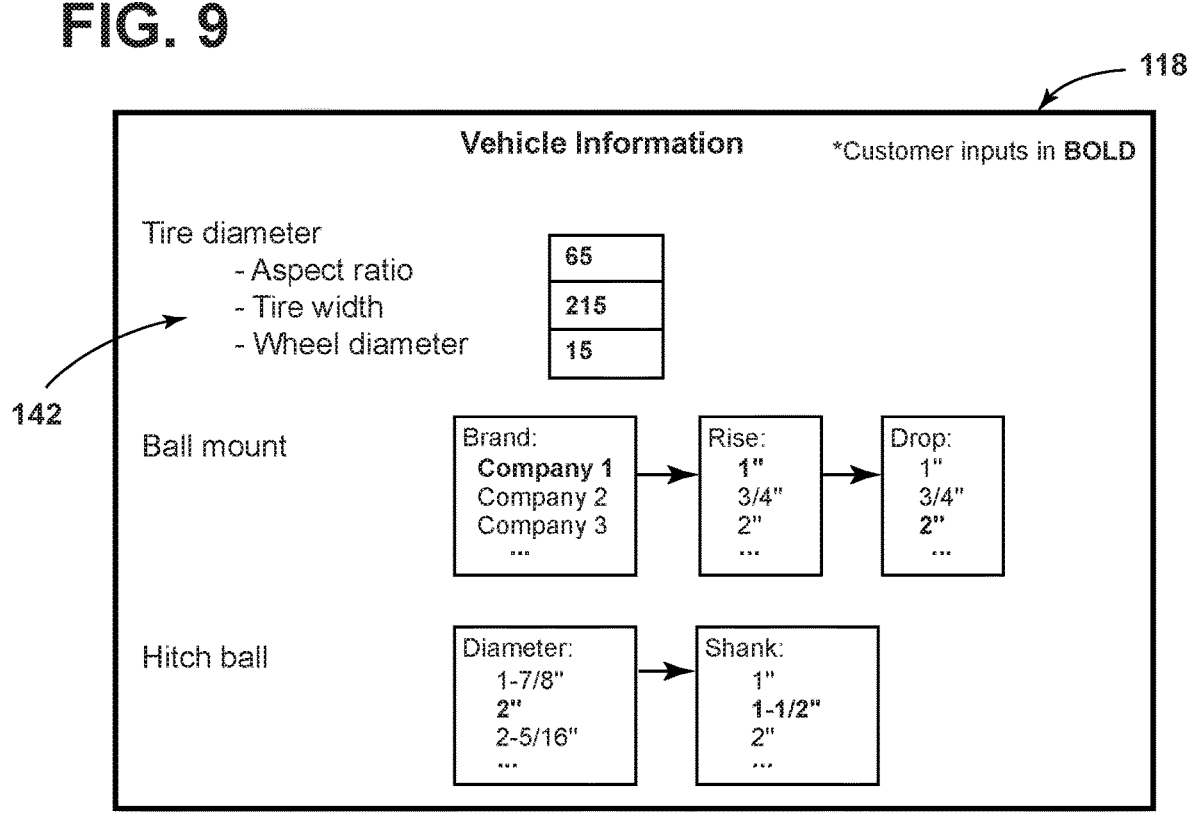
FIG. 10 is an exemplary image on the display wherein a user of the hitch assist system may choose various products with preloaded specifications, according to some examples.

With reference to FIG. 10, in some examples, various brands of vehicle products may be stored within the hitch assist system 10, such as various hitch assemblies, road wheels 82, etc. Additionally, various predefined specifications 142 of the products may also be stored within the memory 126. For example, a user U may choose a type of road wheel 82 and the specifications 142 from that road wheel 82 may be preloaded into the hitch assist system 10. Similarly, the user U may choose a brand of the ball mount 24 and/or hitch ball 26 and predefined selections for various specifications 142 may be chosen and/or automatically detected by the hitch assist system 10. In some examples, the display 118 may provide images of various products thereon for the user U to select. Based on the chosen product, the specifications 142 of that product may be inputted. Furthermore, the portable device 122 and/or an imager 38, 40, 42, 44 on the vehicle 12 may be capable of recognizing barcode such as a universal product code (UPC), a European Article Number (EAN), a two-dimensional code such as a color code, a gray code, a Quick Response (QR) code, a PDF-417 code, a data matrix, combinations thereof, and/or any other type of code image that may be an identifying mark on the product in which the hitch assist system 10 may retrieve the specifications 142 of the product. Further, the specifications 142 may be stored within the memory 126 and/or the hitch assist system 10 may be capable of communicating with a network that provides updated data for one or more products. As provided above, the specifications 142 of the hitch assembly 22 may be stored within the memory 126 after an initial setup for later uses of the hitch assist system 10.

Figure 11:
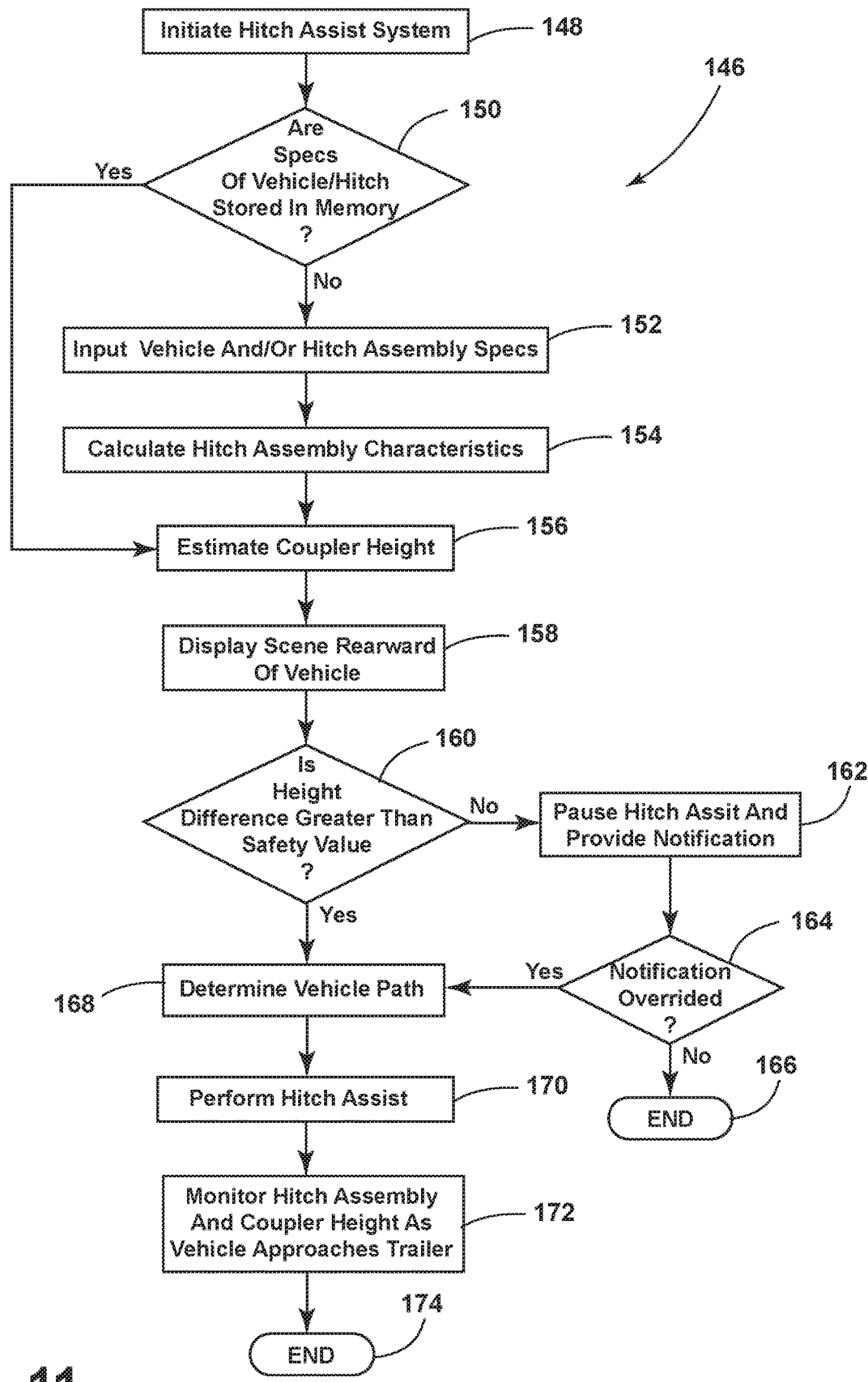
FIG. 11 is a flowchart of a method of entering specifications of the hitch assembly into the hitch assist system to calculate various parameters, such as hitch ball height, according to some examples.

Referring to FIG. 11, a method 146 of aligning the hitch assembly 22 with the coupler 16 is shown, according to some examples. In particular, in step 148, the hitch assist system 10 is initiated. At step 150, in some examples, the hitch assist system 10 can scan the hitch assembly 22 that is operably coupled with the vehicle 12. As provided herein, the memory 126 of the controller 14 may store various specifications 142 of recognized hitch assemblies 22, including the length of the ball mount 24 and/or the height $H_b$ of the hitch ball 26. Once the imaging system 36 detects the hitch assembly 22, the hitch assist system 10 will determine if the hitch assembly 22 is recognized thereby having the specifications 142 of that hitch assembly 22 stored in the memory 126 or if the hitch assembly 22 is newly installed on the vehicle 12 or is unrecognized. In some examples, the hitch ball 26 may alternatively and/or additionally be confirmed by the user U.

If the various specifications 142 of the hitch assembly 22 are not stored in the memory 126, at step 152, the user U may be directed to input various specifications 142 of the vehicle 12 and/or the hitch assembly 22. The new hitch assembly data may then be stored in the memory 126 of the controller 14 for later auto hitch operations utilizing the same hitch assembly 22. Based on the inputted specifications 142, the vehicle 12 may calculate the hitch assembly specifications 142, at step 154, including data such as the hitch ball height $H_b$ relative to the ground and the ball mount length $L_{bm}$. In some examples, additional vehicle equipment may provide additional data to the hitch assist system 10 for determining a height $H_b$ of the hitch ball 26. For example, an amount of payload within the vehicle 12 may raise or lower the vehicle 12, and consequently, the hitch ball 26. To accommodate for a height variance of the vehicle 12, a suspension sensor or any other vehicle sensor may determine a vehicle offset from a neutral position that may be inputted to the controller 14 to determine a more accurate hitch ball height $H_b$. Additionally, over-inflation and under-inflation of the road wheels 82 (e.g., tires) may also affect the hitch ball height $H_b$. Accordingly, a tire pressure sensor or any other vehicle sensor may be utilized to provide a status of the road wheels 82 to the controller 14 of the hitch assist system 10.

Once the hitch assembly specifications 142 are determined, and possibly stored in the memory 126 of the controller 14, a height $H_c$, distance $D_c$, and offset angle of the coupler 16 can also be determined using the available image data 56, at step 156, including using the image processing routine 58. In some instances, the user (such as by way of the HMI 114) may confirm the coupler 16. If the coupler 16 has not been confirmed or if the determined coupler 16 has been rejected, the hitch assist system 10 can be continued, including while instructing the user U to move the vehicle 12 to better align with the trailer 18, until the coupler 16 is identified. When the coupler 16 has been identified and confirmed, the image processing routine 58 may determine a height $H_c$ of the coupler 16. The height $H_c$ of the coupler 16 may be calculated through any known method, such as those described in commonly-assigned U.S. patent application Ser. No. 15/708,463, filed Sep. 19, 2017, now U.S. Pat. No. 10,427,717, and entitled "HITCH ASSIST SYSTEM WITH HITCH COUPLER IDENTIFICATION FEATURE AND HITCH COUPLER HEIGHT ESTIMATION"; U.S. patent application Ser. No. 15/708,427, filed Sep. 19, 2017, now U.S. Pat. No. 10,363,874, and entitled "HITCH ASSIST SYSTEM WITH HITCH COUPLER IDENTIFICATION FEATURE AND HITCH COUPLER HEIGHT ESTIMATION"; U.S. patent application Ser. No. 15/628,062, filed Jun. 20, 2017, now U.S. Pat. No. 10,384,609, and entitled "VEHICLE REAR OBJECT PROXIMITY SYSTEM USING MULTIPLE IMAGERS"; U.S. patent application Ser. No. 15/724,760, filed Oct. 4, 2017, now U.S. Pat. No. 10,414,437, and entitled "HITCH ASSIST SYSTEM FOR CORRECTING MISALIGNMENT BETWEEN A TOW HITCH OF A VEHICLE AND A HITCH COUPLER OF A TRAILER"; U.S. patent application Ser. No. 15/902,051, filed Feb. 22, 2018, now U.S. Pat. No. 10,430,672, and entitled "HITCH ASSIST SYSTEM WITH TRAILER HEIGHT ESTIMATION AND HITCH COUPLER IDENTIFICATION"; U.S. patent application Ser. No. 15/802,831, filed Nov. 3, 2017, now U.S. Pat. No. 10,479,152, and entitled "COMPENSATION FOR TRAILER COUPLER HEIGHT IN AUTOMATIC HITCH OPERATION," the entire disclosures of which are incorporated by reference herein.

At step 158, a scene rearwardly of the vehicle 12 is provided on the display 118. In addition, as illustrated in FIG. 12, the height $H_c$ of the coupler 16, the height $H_b$ of the hitch ball 26, and/or a height difference between the hitch ball 26 and coupler 16 may be provided on the display 118. The height $H_c$ of the coupler 16, the height $H_b$ of the hitch ball 26, and/or a height difference between the hitch ball 26 and the coupler 16 may be routinely updated as the vehicle 12 is moved along the alignment path and/or otherwise towards or away from the trailer 18.

At step 160, a safety value, or offset, is added to the height $H_b$ of hitch ball 26 and that combined value is compared to the height $H_c$ of the coupler 16. The safety value may provide additional clearance to ensure, in some examples, that the coupler 16 is disposed at a height $H_c$ that allows it to be disposed over the hitch ball 26. If the hitch ball height $H_b$ is greater than the coupler height $H_c$, at step 162, the auto hitch operation may be paused and a notification may be provided to the user U through the vehicle notification system 106, which may prompt visual, auditory, and tactile warnings. For instance, vehicle brake lights 108 and vehicle emergency flashers may provide a visual alert and the vehicle horn 110 and/or the speaker 112 may provide an audible alert. Additionally, the controller 14 and/or vehicle notification system 106 may communicate with the HMI 114 of the vehicle 12. At step 164, the user U may override the paused condition of the hitch assist system 10 and/or raise the coupler 16 and unpause the hitch assist system 10. When a user restarts the auto hitch operation, the coupler height $H_c$ may again be determined to verify that the coupler 16 is at a height $H_c$ that is greater than the height $H_b$ of the hitch ball 26. If the notification is not overridden, the method ends at step 166.

If the coupler height $H_c$ is greater than the hitch ball height $H_b$, the path derivation routine 128 can be used to determine the vehicle path 20 to align the hitch ball 26 with the coupler 16 at step 168. In this manner, the controller 14 uses the path derivation routine 128 to determine the path 20 to align the hitch ball 26 with the coupler 16 in an overlapping position over hitch ball 26. Once the path 20 has been derived, the hitch assist system 10 can ask the user U to relinquish control of at least the steering wheel 88 of vehicle 12 (and, optionally, the throttle 100 and brake, in various implementations of the hitch assist system 10 wherein the controller 14 assumes control of the powertrain control system 98 and the brake control system 96 during execution of the operating routine 130) while the vehicle 12 performs an auto hitch operation at step 170. When it has been confirmed that user U is not attempting to control steering system 80 (for example, using the torque sensor 94), the controller 14 begins to move vehicle 12 along the determined path 20. Furthermore, the hitch assist system 10 may determine if the transmission system 102 is in the correct gear and may shift to the desired gear or prompt the user U to shift to the desired gear. The hitch assist system 10 may then control the steering system 80 to maintain the vehicle 12 along the path 20 as either the user U or the controller 14 controls the velocity of vehicle 12 using the powertrain control system 98 and the braking control system 96. As discussed herein, the controller 14 or the user U can control at least the steering system 80, while tracking the position of the coupler 16 until the vehicle 12 reaches the endpoint. As the vehicle 12 approaches the trailer 18, the hitch assist system 10 may monitor the hitch ball height $H_b$ and the coupler height $H_c$ at step 172. When the hitch ball 26 reaches the desired position 140 for the desired alignment with the coupler 16 the operating routine 130 ends at step 174.

Figure 13:
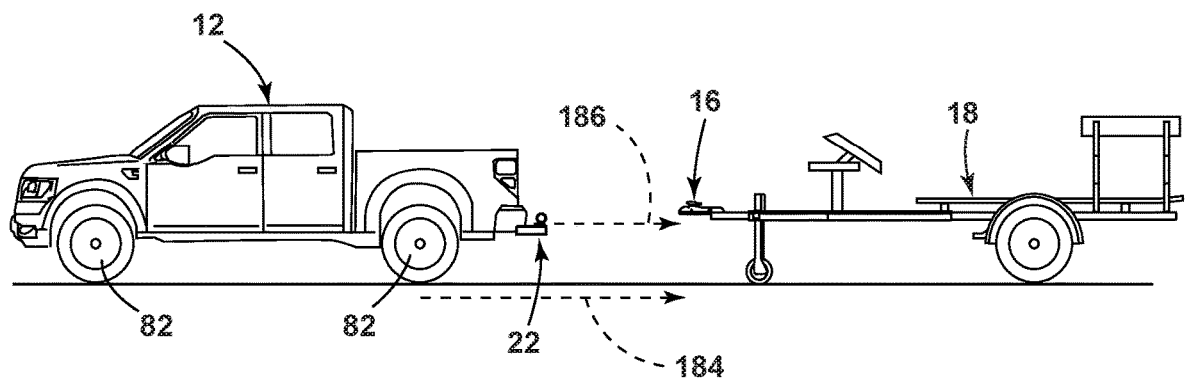
FIG. 13 is a side perspective view of the vehicle and the trailer and two projected lines that may be illustrated on the display, the first projected line along a ground surface and the second projected line at a hitch ball height, according to some examples.
Figure 14:
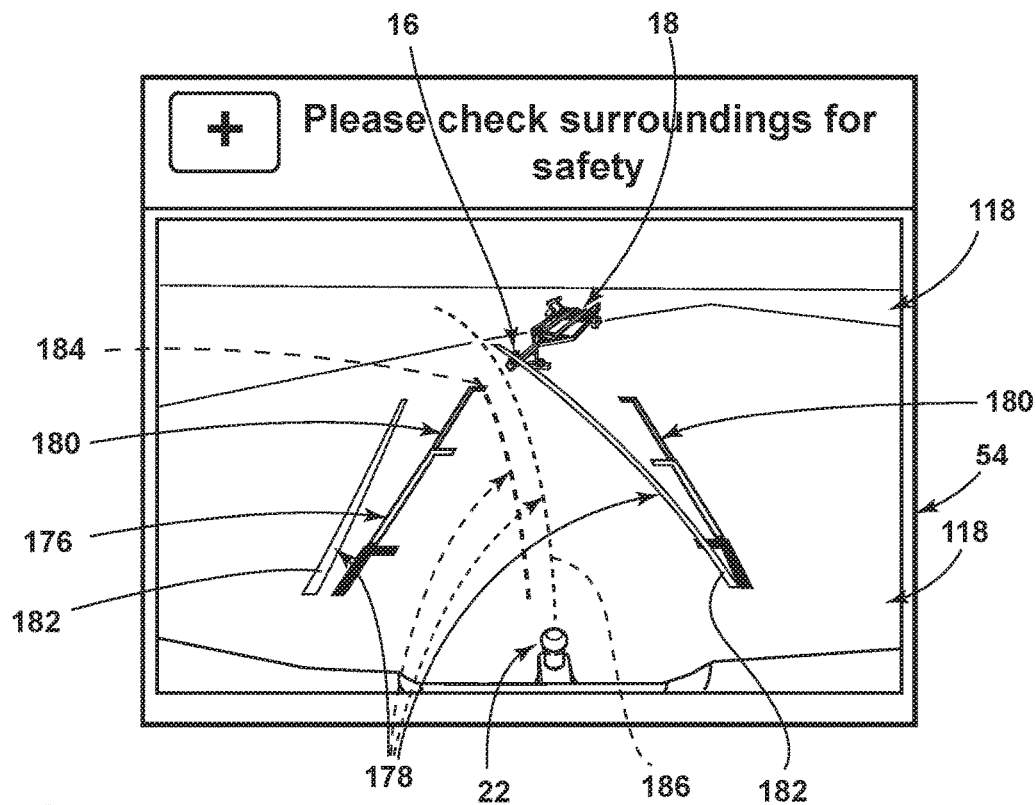
FIG. 14 is an image provided on a display presenting an area rearwardly of the vehicle, according to some examples.

Referring to FIGS. 13 and 14, in some instances, the hitch assist system 10 may allow driver interaction while the hitch assembly 22 approaches the coupler 16 of the trailer 18. For example, the user U may control any one or more of the steering system 80, the powertrain control system 98, and/or the braking control system 96. In some instances, as provided herein, when the transmission is placed in the reverse gear, the rear imager 40 operates in a backup assist or hitch assist mode for helping the user U move to a target position. The image data 56 generated by one or more of the imagers 38, 40, 42, 44 creates the image patch 54 that is displayed on the display 118 within the vehicle 12 and/or on the display 118 of the portable device 122. An overlay 176 is presented to the user through the display 118, which may include a first set of dynamic, and/or a second set of static locus lines 178, 180 to aid the user in maneuvering the vehicle 12 to a target, such as the coupler 16 of the trailer 18, and/or a parking spot. As the user U turns the steering wheel 88, the steering angle sensor 86 sends steering wheel angle data to the controller 14. The rear imager 40 and an image processor analyze the data from the steering angle sensor 86, along with other vehicle data, which may include the gear ratio, wheel base size, wheel radius and vehicle speed data, and calculates a size and direction for the two sets of locus lines 178, 180 to be displayed as an overlay 176 in the displayed images. It will be appreciated that any one or more of the locus lines 178, 180 described herein may be present or absent from the display 118 without departing from the scope of the present disclosure.

The first set of locus lines 178 displayed have a direction that may be determined in response to a change in the steering wheel angle and other vehicle data related to wheelbase, radius, and gear ratio. In some instances, the first set of locus lines 178 may include a pair of peripheral lines 182 that illustrate the width of the vehicle 12 in a vehicle side-to-side direction and/or a lower projection line 184 that may align with a centerline of the vehicle 12 in the side-to-side direction. The pair of peripheral lines 182 and the lower projection line 184 may be projected onto the ground of the image patch 54 provided on the display 118. Additionally, and/or alternatively, an upper projection line 186 may also be presented on the display 118 that illustrates the trajectory of the hitch ball 26, and possibly at the hitch ball height $H_b$. Accordingly, the lower and upper projection lines 184, 186 may be offset from one another based on the variance in height therebetween, as exemplarily illustrated in FIG. 13.

The overlay 176 position of the first set of locus lines 178 depends on the turning radius and the current steering wheel angle of the vehicle 12, so the locus lines 178 will change as the steering wheel angle is changed. As the user U and/or the hitch assist system 10 turns the steering wheel 88, each step and direction the steering wheel 88 moves is reflected in the first set of the locus line direction as displayed. Each time the steering angle δ changes, a replacement set of the first set of locus lines 178 is displayed. In this respect, the first set of locus lines 178 display a path 20 of the vehicle 12 and/or the hitch assembly 22 so that the user gets a true sense of where the vehicle 12 is headed as they turn the steering wheel 88 and approach their desired destination. Additionally, the upper projection line 186 may be updated based on a change in hitch ball height $H_b$.

As the steering wheel angle moves from a center position, not only the direction of the first set of locus lines 178 is adjusted but the length of the first set of locus lines 178 may also be adjusted accordingly. For example, as the steering wheel 88 is turned away from the center, the first set of locus lines 178 length may be increased. As the steering wheel 88 is turned towards the center, the first set of locus lines 178 may be decreased in length. For each change in steering wheel angle, the controller 14 recalculates and displays the first set of locus lines 178 at the updates the angle and length. At a maximum angle, either left or right of center, the locus lines 178 may extend to a maximum length dimension. Accordingly, the first set of locus lines 178 provide the projected vehicle path 20 to the target. The user U is given an indication of where the vehicle 12 is headed based on the steering wheel angle position and the vehicle wheelbase information.

In addition to the first set of locus lines 178, the second set of locus lines 180 may also be displayed. The second set of locus lines 180 may be fixed and provide the vehicle path 20 to a target. Unlike the first set of locus lines 178, the second set of locus lines 180 may remain fixed in length and direction. In addition to the imager scene and the icons overlaid on the displayed image, textual instructions or prompts may also be provided on the display 118 or on a separate screen associated with the vehicle 12 (e.g., an instrument cluster display 118). The second set of locus lines 180 may also include various portions illustrated in various colors. In some examples, a first portion of the second set of locus lines 180 may be a first (e.g., red) color. A second portion may be separated from the vehicle 12 by the first portion and may be illustrated in a second (e.g., yellow) color. A third portion may be separated from the vehicle 12 by the first and second portions and be portrayed in a third (e.g., green) color.

Referring still to FIGS. 13 and 14, when the vehicle 12 is placed in reverse, a portion of the rear of the vehicle 12 (e.g., the bumper) and the surrounding area into which the backup maneuver will be performed may be displayed. The hitch assembly 22 extending rearwardly of the bumper is also visible. The image data 56 generated by the rear imager 40 may also include the trailer 18 that a user desired to couple to the vehicle 12. The trailer 18, and the coupler 16, may be identified through any method, such as those described in commonly-assigned U.S. patent application Ser. No. 15/708,463, filed Sep. 19, 2017, now U.S. Pat. No. 10,427,717, and entitled "HITCH ASSIST SYSTEM WITH HITCH COUPLER IDENTIFICATION FEATURE AND HITCH COUPLER HEIGHT ESTIMATION"; U.S. patent application Ser. No. 15/708,427, filed Sep. 19, 2017, now U.S. Pat. No. 10,363,874, and entitled "HITCH ASSIST SYSTEM WITH HITCH COUPLER IDENTIFICATION FEATURE AND HITCH COUPLER HEIGHT ESTIMATION"; U.S. patent application Ser. No. 15/628,062, filed Jun. 20, 2017, now U.S. Pat. No. 10,384,609, and entitled "VEHICLE REAR OBJECT PROXIMITY SYSTEM USING MULTIPLE IMAGERS"; U.S. patent application Ser. No. 15/701,644, filed Sep. 12, 2017, now U.S. Pat. No. 10,427,716, and entitled "HITCH ASSIST SYSTEM AND METHOD"; and U.S. patent application Ser. No. 15/802,831, filed Nov. 3, 2017, now U.S. Pat. No. 10,479,152, and entitled "COMPENSATION FOR TRAILER COUPLER HEIGHT IN AUTOMATIC HITCH OPERATION," the entire disclosures of which are incorporated by reference herein.

In some instances, the upper projection line 186 may be provided on the display 118 when the hitch assist system 10 is operated in a semi-autonomous and/or manual mode. These modes may be selected by the user U and/or may be automatically chosen by the hitch assist system 10 when the hitch assist system 10 is operating in a degraded mode. When the upper projection line 186 is to be displayed, the hitch ball height $H_b$ may be detected by the hitch assist system 10 through any method provided herein. Based on the detected hitch ball 26, the height $H_c$ of the coupler 16 may be determined. Based on the calculated hitch ball height $H_b$, the upper projection line 186 may be generated and illustrated on the display 118.

Figure 15:
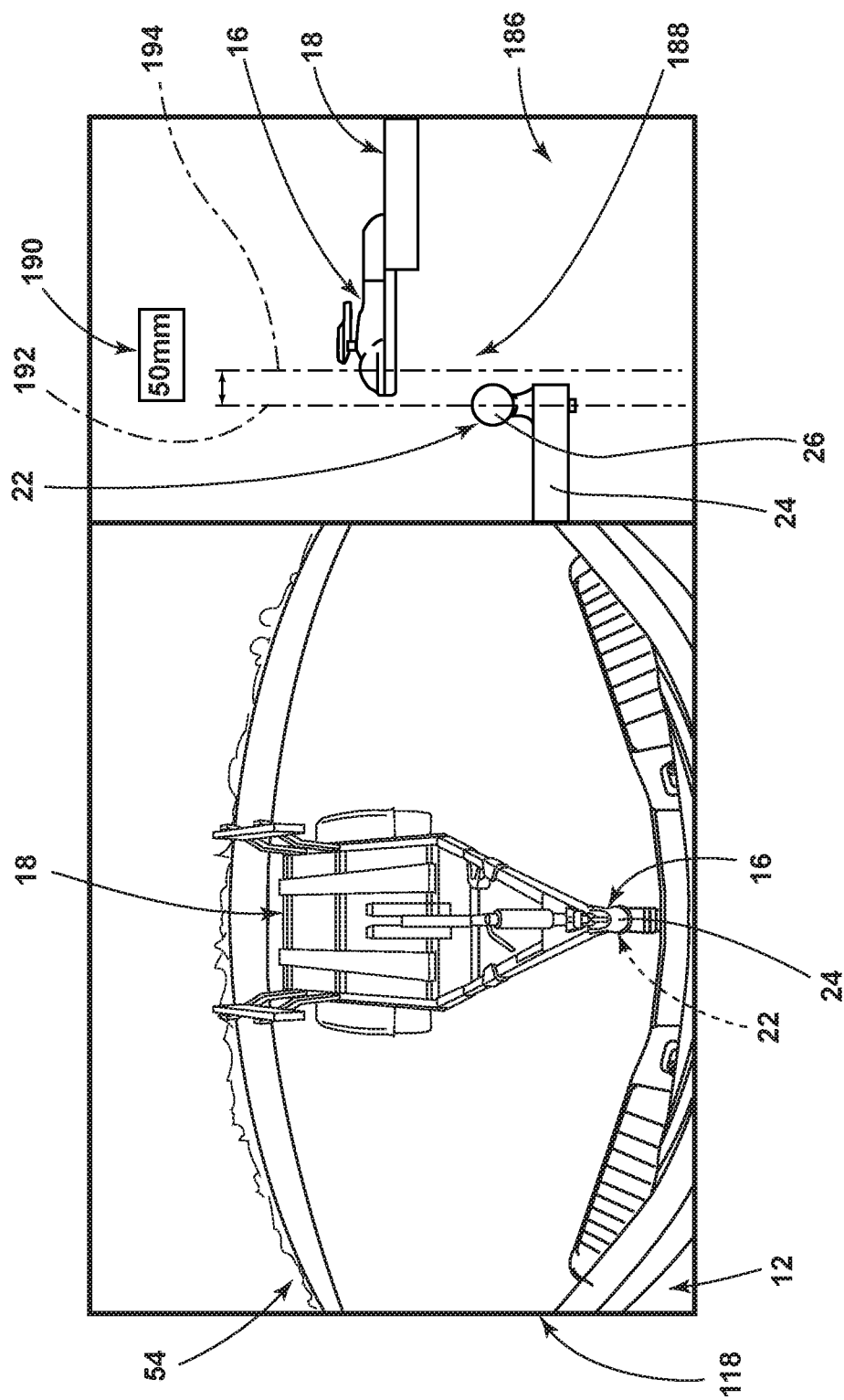
FIG. 15 is an image provided on a display presenting an area rearwardly of the vehicle and a generated side view image of the hitch assembly and the coupler, according to some examples.
Figure 16:
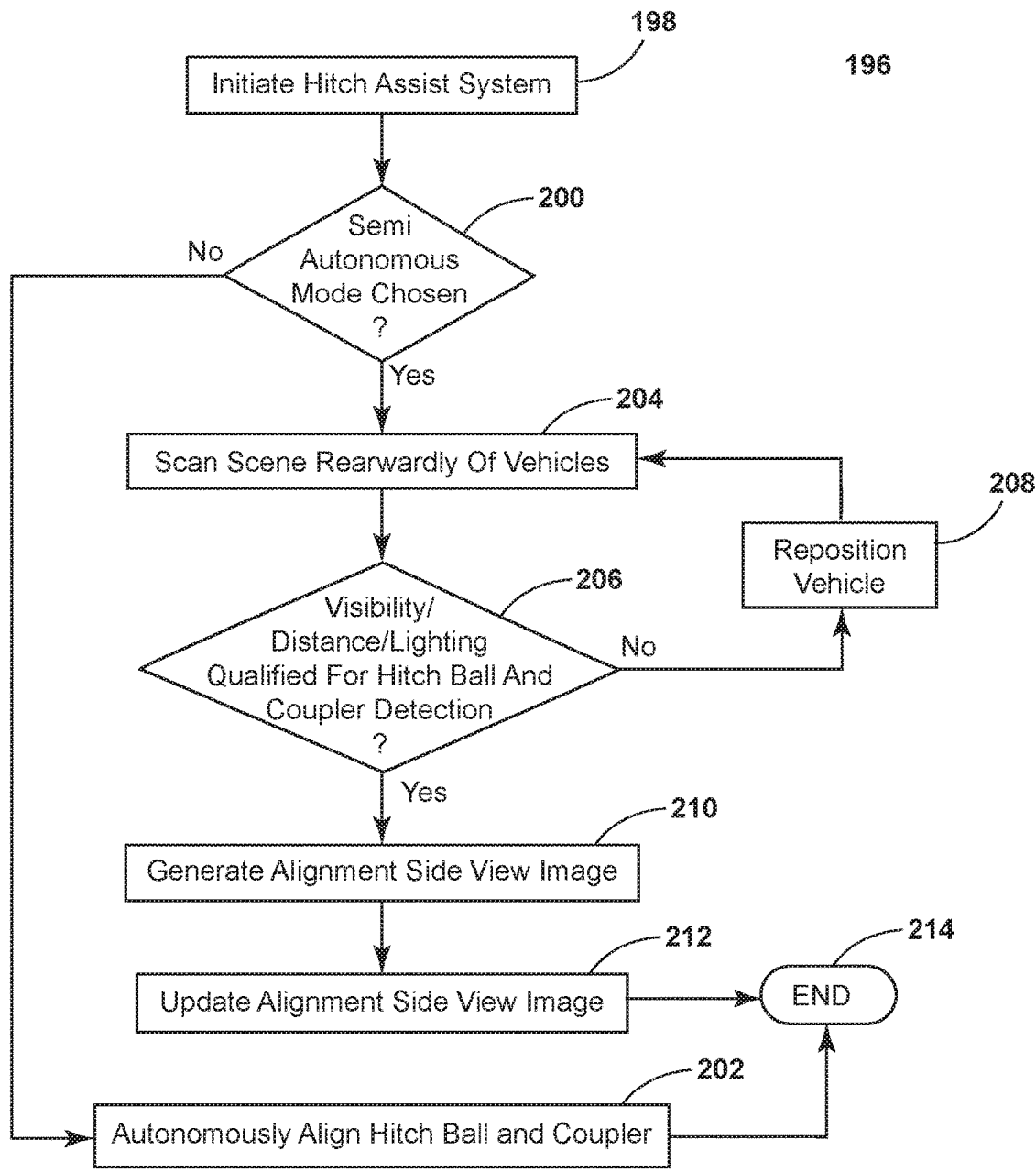
FIG. 16 is a flowchart of a method of operating the hitch assist system with the generated side view image, according to some examples.

Referring to FIGS. 15 and 16, in addition to and/or alternatively to the overlay 176, the display 118 may provide a generated, or virtual, side view 188 of the hitch alignment. In such instances, the vehicle sensing system 46, including the one or more imagers 38, 40, 42, 44 and one or more proximity sensors 64, detect the hitch ball 26 and the trailer coupler 16. As provided herein, the hitch assist system 10 may also calculate the height $H_b$ of the hitch ball 26 and the height $H_c$ of the coupler 16. Based on the detected heights $H_b$, $H_c$, and other parameters, a side view generated alignment image 188 is generated. Accordingly, a user U may be able to view when the coupler 16 is aligned with the hitch ball 26 in the vehicle forward/rearward direction. One or more additional instructions may be provided on the generated image. For example, a distance 190 to align may be provided on the display 118. Additionally, phantom lines 192, 194 may define a longitudinal line of the hitch ball 26 and/or the coupler 16, respectively, that once aligned or disposed along a common axis, define a substantially aligned relationship between the coupler 16 and the hitch ball 26.

Referring to FIG. 16, a method 196 of aligning the hitch assembly 22 with the coupler 16 is shown, according to some examples. In particular, in step 198, the hitch assist system 10 is initiated. At step 200, the user U may choose whether to operate in an autonomous mode or a semi-autonomous/manual mode. If the user U chooses to operate the hitch assist system 10 in an autonomous mode, the system performs the hitch assist operation to align the hitch ball 26 with the coupler 16, through any method provided herein at step 202. If the hitch assist system 10 is operated in the semi-autonomous/manual mode, at step 204, the vehicle 12 scans the scene rearwardly of the vehicle 12 and may determine whether the hitch ball 26 and/or the coupler 16 are within the field of view of the one or more images, and/or other sensors within the vehicle sensing system 46. The distance between the coupler 16 and the hitch ball 26 may also be calculated. At step 206, the ambient lighting conditions may also be detected. If the hitch ball 26 and/or coupler 16 is undetectable, the distance between the two components may not be calculated, and/or the lighting conditions are negatively affecting the system capabilities, the hitch assist system 10 may notify the user U to reposition the vehicle 12 at step 208.

At step 210, if the hitch assist system 10 is capable of calculating the hitch ball height $H_b$, the coupler height $H_c$, and/or the distance between the coupler 16 and the hitch ball 26, the generated image of the coupler 16 and the hitch ball 26 is illustrated on the display 118, as exemplarily shown in FIG. 15. The generated image may continue to be provided and updated on the display 118 at step 212 until the user U ends the hitch assist system 10 and/or the system detects that the hitch ball 26 and the coupler 16 have been engaged with one another at step 214.

A variety of advantages may be derived from the use of the present disclosure. For example, use of the disclosed hitch assist system provides a system for calculating a hitch ball height. Based on the calculated hitch ball height, a display may illustrate a projection line of the hitch ball as the vehicle is moved towards the trailer. The display may also illustrate a generated side view image of the hitch assembly and the coupler to assist in locating the coupler over the hitch assembly. By illustrating the projection lines and the generated image, the hitch assist system may provide additional safety features and functionality to the hitch assist system.

According to various examples, a hitch assist system is provided herein. The hitch assist system includes an imager for capturing one or more images of a trailer having a coupler. The hitch assist system also includes a user-input device for inputting specifications of a hitch ball. The hitch assist system further includes a controller for estimating a hitch ball height based on inputted specifications; and estimating a trailer height based on a height and projective geometry of the imager. Examples of the hitch assist system can include any one or a combination of the following features:

- the user-input device comprises a touchscreen display of a vehicle;
- the touchscreen display registers one or more touch events thereon for inputting the specifications of the hitch ball;
- the imager is located on a rear of a vehicle and is disposed to capture one or more images of a rear-vehicle scene;
- the estimating the hitch ball height includes determining a road wheel condition;
- the trailer height comprises a height of the hitch coupler relative to a ground surface;
- the display displays a projection line of the hitch ball as the vehicle approaches the coupler;
- a memory for storing the specifications of the hitch ball;
- the inputting specifications of a hitch ball includes displaying various images of prestored brands of hitch assemblies; and/or
- the user-input device includes a display that illustrates a generated side image of the hitch ball and the coupler as the hitch ball approaches the coupler.

Moreover, a hitch assist method is provided herein. The method includes capturing one or more images of a trailer having a coupler through an imager. The method also includes estimating a coupler height based on a height and projective geometry of the imager. Lastly, the method includes illustrating an overlay on a display to assist in aligning a hitch ball under the coupler. Examples of the hitch assist method can include any one or a combination of the following features:

- the overlay is a side view generated image of the hitch ball and the coupler;
- inputting one or more specifications of a vehicle or a hitch assembly; and estimating a height of the hitch ball based on the one or more specifications;
- the overlay is a first projected line that is aligned with a trajectory of the hitch ball;
- the step of inputting one or more specifications of the vehicle is performed using a touchscreen display of a vehicle; and/or the overlay includes a second line projected onto a ground surface rearwardly of a vehicle on a display.

According to some examples, a hitch assist system is provided herein. The hitch assist system includes a sensing system configured to detect a trailer having a coupler. A user-input device is used for specifying a specification of a hitch ball or the coupler. The hitch assist system further includes a controller for estimating a height difference between the sensing system and the hitch coupler based on projective geometry of the sensing system and generating a schematic image of the hitch ball or the coupler on a display. Examples of the hitch assist system can include any one or a combination of the following features:

the sensing system includes an imager for capturing one or more images of the coupler or the hitch ball;

the sensing system includes a proximity sensor for detecting the coupler or the hitch ball; and/or the specification of the hitch ball includes at least one of a ball mount length and a hitch ball height.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It will be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It will be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A hitch assist system for a vehicle, the hitch assist system comprising:
   an imager for capturing one or more images of a trailer having a coupler, wherein the images are directed rearward of the vehicle;
   a user-input device for inputting specifications of a hitch ball; and
   a controller for:
     estimating a hitch ball height based on inputted specifications;
     estimating a trailer height based on a height and projective geometry of the imager;
     generating a virtual side image of the hitch ball and the coupler based on the captured one or more images and the estimated hitch ball height and estimated trailer height, and updating the virtual side image as the hitch ball approaches the coupler; and
   a display that illustrates the generated virtual side image of the hitch ball and the coupler.

2. The hitch assist system of claim 1, wherein the user-input device and the display comprises a touchscreen display of the vehicle.

3. The hitch assist system of claim 2, wherein the touchscreen display registers one or more touch events thereon for inputting the specifications of the hitch ball.

4. The hitch assist system of claim 2, wherein the estimating the hitch ball height includes determining a road wheel condition of a road wheel of the vehicle.

5. The hitch assist system of claim 2, wherein the display displays a projection line of the hitch ball as the vehicle approaches the coupler.

6. The hitch assist system of claim 1, wherein the imager is located on a rear of the vehicle and is disposed to capture one or more images of a rear-vehicle scene.

7. The hitch assist system of claim 1, wherein the trailer height comprises a height of the hitch coupler relative to a ground surface.

8. The hitch assist system of claim 1, further comprising:
   a memory for storing the specifications of the hitch ball.

9. The hitch assist system of claim 1, wherein the inputting specifications of a hitch ball includes displaying various images of prestored brands of hitch assemblies.

10. The hitch assist system of claim 1, wherein the display further illustrates lines that define a longitudinal distance between the hitch ball and the coupler.

11. A hitch assist method comprising the steps of:
    capturing one or more images of a trailer having a coupler through an imager;
    estimating a coupler height based on a height and projective geometry of the imager, wherein the imager is directed rearward of a vehicle; and
    illustrating an overlay on a display to assist in aligning a hitch ball on the vehicle under the coupler, wherein the overlay includes a side view generated virtual image of the hitch ball and the coupler that is updated as the hitch ball approaches the coupler, and wherein the virtual image is based on the one or more images of the trailer and the estimated height of the coupler.

12. The hitch assist method of claim 11, wherein the side view generated image includes lines that define a longitudinal distance between the hitch ball and the coupler.

13. The hitch assist method of claim 11, further comprising:

inputting one or more specifications of a vehicle or a hitch assembly; and estimating a height of the hitch ball based on the one or more specifications.

14. The hitch assist method of claim 13, wherein the step of inputting one or more specifications of the vehicle is performed using a touchscreen display of a vehicle, wherein the one or more specifications include specifications of a hitch ball, and wherein a hitch ball height is estimated based on the one or more specifications and road wheel information of a vehicle.

15. The hitch assist method of claim 11, wherein the overlay includes a first projected line that is aligned with a trajectory of the hitch ball.

16. The hitch assist method of claim 15, wherein the overlay includes a second line projected onto a ground surface rearwardly of a vehicle on a display.

17. A hitch assist system comprising:
a sensing system configured to detect a trailer having a coupler, wherein the sensing system includes an imager directed rearward of a vehicle for capturing one or more images of the coupler or a hitch ball on the vehicle;
a user-input device for specifying a specification of a hitch ball or the coupler; and
a controller for:
estimating a hitch ball height and a height difference between the estimated hitch ball height and the hitch coupler based on projective geometry of the sensing system; and
generating a schematic image of the hitch ball and the coupler on a display based on the captured one or more images and the estimated hitch ball height and estimated trailer height, wherein the schematic image comprises a generated virtual side image of the hitch ball and the coupler, and updating the schematic image as the hitch ball approaches the coupler.

18. The hitch assist system of claim 17, wherein the display further illustrates lines that define a longitudinal distance between the hitch ball and the coupler.

19. The hitch assist system of claim 17, wherein the sensing system includes a proximity sensor for detecting the coupler or the hitch ball.

20. The hitch assist system of claim 17, wherein the specification of the hitch ball includes at least one of a ball mount length and a hitch ball height.

* * * * *